United States Patent
Jacobs, II

(10) Patent No.: US 10,795,340 B2
(45) Date of Patent: Oct. 6, 2020

(54) METHODS OF MANUFACTURING A PLURALITY OF DISCRETE OBJECTS FROM A BODY OF MATERIAL CREATED BY ADDITIVE MANUFACTURING

(71) Applicant: Proto Labs, INC, Maple Plain, MN (US)

(72) Inventor: James L. Jacobs, II, New London, NH (US)

( * ) Notice: Subject to any disclaimer, the term of this patent is extended or adjusted under 35 U.S.C. 154(b) by 109 days.

(21) Appl. No.: 16/030,498

(22) Filed: Jul. 9, 2018

(65) Prior Publication Data
US 2019/0011903 A1   Jan. 10, 2019

Related U.S. Application Data

(60) Provisional application No. 62/530,419, filed on Jul. 10, 2017.

(51) Int. Cl.
*G05B 19/4099* (2006.01)
*B33Y 50/02* (2015.01)

(52) U.S. Cl.
CPC ........ *G05B 19/4099* (2013.01); *B33Y 50/02* (2014.12); *G05B 2219/35134* (2013.01); *G05B 2219/49007* (2013.01)

(58) Field of Classification Search
CPC ...... G05B 19/4099; G05B 2219/35134; G05B 2219/49007; B33Y 50/02
See application file for complete search history.

(56) References Cited

U.S. PATENT DOCUMENTS

| | | | |
|---|---|---|---|
| 9,114,032 B1 * | 8/2015 | Pulugurtha | C23F 1/02 |
| 9,566,138 B2 | 2/2017 | Fisker | |
| 2004/0107019 A1 | 6/2004 | Keshavmurthy et al. | |
| 2013/0015596 A1 | 1/2013 | Mozeika et al. | |
| 2014/0274649 A1 * | 9/2014 | Kerr | A61M 1/3693 494/20 |

(Continued)

FOREIGN PATENT DOCUMENTS

| | | |
|---|---|---|
| DE | 102015116925 | 4/2017 |
| WO | 2017051029 | 3/2017 |

OTHER PUBLICATIONS

Hybrid Machine Combines Milling and Additive Manufacturing; 2017; retrieved at http://www.additivemanufacturing.media/blog/post/hybrid-machine-combines-milling-and-additive-manufacturing on May 4, 2017.

*Primary Examiner* — Michael J Brown
(74) *Attorney, Agent, or Firm* — Caldwell Intellectual Property Law

(57) ABSTRACT

A system for manufacturing a discrete object from an additively manufactured body of material including a precursor to a discrete object and at least a reference feature is disclosed. The system includes an automated manufacturing device, the automated manufacturing device including at least a controller configured to receive a graphical representation of precursor to a discrete object, receive a graphical representation of at least a reference feature on the precursor to the discrete object, and generate a computer model of the body of material, wherein the computer model of the body of material includes the graphical representation of the precursor to the discrete object and the graphical representation of the at least a reference feature.

25 Claims, 21 Drawing Sheets

(56) References Cited

U.S. PATENT DOCUMENTS

| | | | |
|---|---|---|---|
| 2015/0279748 A1* | 10/2015 | Spath | H01L 21/78 |
| | | | 438/14 |
| 2016/0031010 A1* | 2/2016 | O'Neill | B29C 64/153 |
| | | | 419/28 |
| 2016/0144572 A1 | 5/2016 | Elmieh et al. | |
| 2016/0288417 A1 | 10/2016 | McCann et al. | |
| 2016/0368077 A1 | 12/2016 | Swaminathan | |
| 2017/0014909 A1 | 1/2017 | Tanaka et al. | |
| 2018/0292355 A1* | 10/2018 | Gold | G01N 29/04 |

* cited by examiner

METHODS OF MANUFACTURING A PLURALITY OF DISCRETE OBJECTS FROM A BODY OF MATERIAL CREATED BY ADDITIVE MANUFACTURING

This application claims the benefit of priority of U.S. Provisional Patent Application Ser. No. 62/530,419, filed on Jul. 10, 2017, and titled "METHODS OF MANUFACTURING A PLURALITY OF DISCRETE OBJECTS FROM A BODY OF MATERIAL CREATED BY ADDITIVE MANUFACTURING," which is incorporated by reference herein in its entirety.

FIELD OF THE INVENTION

The present invention generally relates to the field of subtractive manufacturing. In particular, the present invention is directed to methods of manufacturing a plurality of discrete objects from a body of material created by additive manufacturing.

BACKGROUND

Many types of objects are manufactured using rotary-tool milling and other types of subtractive manufacturing processes. Typically, a single object is or multiple objects are made from a single body of material, such as a block or slab of steel or aluminum. For example, steel and aluminum parts for any of a wide variety of assemblies are often machined from individual bodies of material using one or more milling machines. However, making such machined parts can be labor intensive as operators load and unload individual bodies of material to and from milling machines. In addition, geometries are generally limited to those that can be manufactured economically by a subtractive manufacturing process.

SUMMARY OF THE DISCLOSURE

In an aspect, a system for manufacturing a plurality of discrete objects from an additively manufactured body of material from a computer model of an additively manufactured body of material is described. The additively manufactured body of material includes at least a precursor to a plurality of discrete objects, at least an extension, and at least a reference feature and a graphical representation of the at least a precursor to the plurality of discrete objects to be machined from the additively manufactured body of material. The system includes an automated manufacturing device. The automated manufacturing device includes at least a controller configured to receive a graphical representation of the at least a precursor to the plurality of discrete objects to be machined from the additively manufactured body of material, receive a graphical representation of the at least an extension, receive a graphical representation of the at least a reference feature, receive a graphical representation of a first plane and a graphical representation of a second plane, and generate the computer model of the additively manufactured body of material, wherein the computer model of the additively manufactured body of material includes the graphical representation of the first plane, the graphical representation of the second plane, the graphical representation of the at least a precursor to the plurality of discrete objects to be machined from the additively manufactured body of material, the graphical representation of at least an extension, and the graphical representation of the at least a reference feature.

In another aspect, a method of manufacturing a discrete object from an additively manufactured body of material, the additively manufactured body of material including at least a precursor to a plurality of discrete objects, at least an extension, and at least a reference feature is described. The method includes receiving a graphical representation of the at least a precursor to the plurality of discrete objects to be machined from the additively manufactured body of material. The method includes receiving a graphical representation of the at least an extension. The method includes receiving a graphical representation of the at least a reference feature. The method includes receiving a graphical representation of a first plane and a graphical representation of a second plane. The method includes generating the computer model of the additively manufactured body of material. The computer model of the additively manufactured body of material includes the graphical representation of the first plane, the graphical representation of the second plane, the graphical representation of the at least a precursor to the plurality of discrete objects to be machined from the additively manufactured body of material, the graphical representation of at least an extension, and the graphical representation of the at least a reference feature.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1 is a flow diagram illustrating an exemplary method of manufacturing a plurality of discrete objects from an additively manufactured body of material in accordance with an embodiment;

FIG. 2 is a perspective view of an exemplary additively manufactured body of material prior to subtractively forming a discrete object from the additively manufactured body of material in accordance with an embodiment;

FIG. 3A is a perspective view of an exemplary at least a precursor to a plurality of discrete objects in accordance with an embodiment FIG. 3B is a perspective view of an exemplary at least a precursor to a plurality of discrete objects with at least an extension in accordance with an embodiment;

FIG. 4 is a perspective view of an exemplary manufacturing device in accordance with an embodiment;

FIG. 5 is a perspective view of an exemplary additively manufactured body of material in accordance with an embodiment;

FIG. 6 is a cross-sectional view of an additively manufactured body of material with a support in accordance with an embodiment;

FIG. 7A is a cross-sectional view of an additively manufactured body of material with a support in accordance with an embodiment;

FIG. 7B is a cross-sectional view of an additively manufactured body of material with a support in accordance with an embodiment;

FIG. 8 is a perspective view of an exemplary additively manufactured body of material with a temporary support frame in accordance with an embodiment;

DETAILED DESCRIPTION

Figure 1:
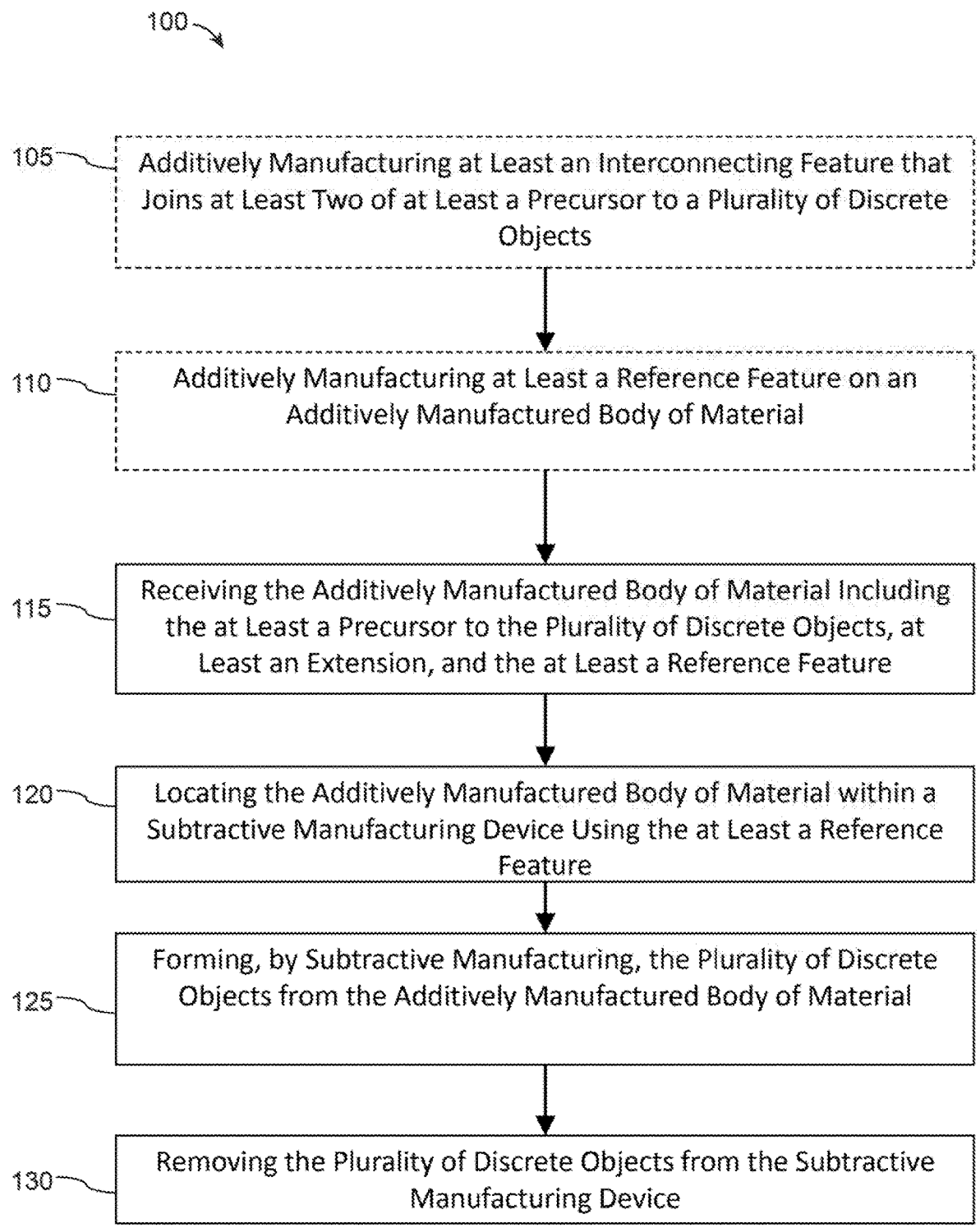

In one aspect, the present invention is directed to methods of manufacturing a plurality of discrete objects from a body of material created by additive manufacturing. Examples of discrete objects that can be manufactured using techniques disclosed herein include, but are not limited to, finished parts that may ultimately be assembled into a finished product (such as consumer products, military equipment, commercial equipment, among others), precursors to finished parts (such as precursors that may require further processing to create finished parts for assembly), finished standalone products, and precursors to finished standalone products, among others. Herein the terms "part" and "object," and the plural forms of these terms, may be used interchangeably. It is noted that for any given additively manufactured body of material, multiple discrete parts may all be identical to one another or may all be different from one another or some may be identical and others may be different. As used herein, a "precursor" to a finished discrete object may be an object that requires further processing to become a finished discrete object; e.g., an object liberated from a body of material from which it is made or additively manufactured, for which further processing steps are required to produce a finished object or an object that by subtractive manufacturing achieves one or more tolerances, flatnesses, surface finishes and/or features.

An additively manufactured body of material may be produced by an additive manufacturing process. In an embodiment, an additive manufacturing process is a process in which material is added incrementally to a body of material in a series of two or more successive steps. A material may be added in the form of a stack of incremental layers; each layer may represent a cross-section of an object to be formed upon completion of an additive manufacturing process. Each cross-section may, as a non-limiting example be modeled on a computing device as a cross-section of graphical representation of the object to be formed; for instance, a computer aided design (CAD) tool may be used to receive or generate a three-dimensional model of an object to be formed, and a computerized process may derive from that model a series of cross-sectional layers that, when deposited during an additive manufacturing process, together will form the object. Steps performed by an additive manufacturing system to deposit each layer may be guided by a computer aided manufacturing (CAM) tool. In an embodiment, a series of layers are deposited in a substantially radial form, for instance by adding a succession of coatings to the workpiece. Similarly, a material may be added in volumetric increments other than layers, such as by depositing physical voxels in rectilinear form or other forms. Additive manufacturing, as used in this disclosure, may include manufacturing done at an atomic or nano level. Additive manufacturing may also include manufacturing bodies of material that are produced using hybrids of other types of manufacturing processes; for instance, additive manufacturing may be used to join together two portions of a body of material, where each portion has been manufactured using a distinct manufacturing technique. A non-limiting example may be a forged body of material; an example of a forged body of material may have welded material deposited upon it, which then comprises an additive manufactured body of material.

Deposition of material in an additive manufacturing process may be accomplished by any suitable means. Deposition may be accomplished by stereolithography, in which successive layers of polymer material are deposited and then caused to bind with previous layers using a curing process such as curing using ultraviolet light, for example. Additive manufacturing processes may include "three-dimensional printing" processes that deposit successive layers of powder and binder; the powder may include polymer or ceramic powder, and the binder may cause the powder to adhere, fuse, or otherwise join into a layer of material making up the body of material or product. Additive manufacturing may include metal three-dimensional printing techniques such as laser sintering including direct metal laser sintering (DMLS) or laser powder-bed fusion. Likewise, additive manufacturing may be accomplished by immersion in a solution that deposits layers of material on a body of material, by depositing and sintering materials having melting points such as metals, such as selective laser sintering, by applying fluid or paste-like materials in strips or sheets and then curing that material either by cooling, ultraviolet curing, and the like, any combination of the above methods, or any additional methods that involve depositing successive layers or other increments of material. Methods of additive manufacturing may include without limitation vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing, or combine two or more methods. Companies producing additive manufacturing equipment include 3D Systems, Stratasys, formLabs, Carbon3D, Solidscape, voxelj et, ExOne, envisiontec, SLM Solutions, Arcam, EOS, Concept Laser, Renishaw, XJET, HP, Desktop Metal, Trumpf, Mcor, Optomec, Sciaky, and MarkForged amongst others.

Additive manufacturing may include deposition of initial layers on a substrate. Substrate may include, without limitation, a support surface of an additive manufacturing device, or a removable item placed thereon. Substrate may include a base plate, which may be constructed of any suitable material; in some embodiments, where metal additive manufacturing is used, base plate may be constructed of metal, such as titanium. Base plate may be removable. One or more support features may also be used to support additively manufactured body of material during additive manufacture; for instance and without limitation, where a downward-facing surface of additively manufactured body of material is constructed having less than a threshold angle of steepness, support structures may be necessary to support the downward-facing surface; threshold angle may be, for instance 45 degrees. Support structures may be additively constructed, and may be supported on support surface and/or on upward-facing surfaces of additively manufactured body of material. Support structures may have any suitable form, including struts, buttresses, mesh, honeycomb or the like; persons skilled in the art, upon reviewing the entirety of this disclosure, will be aware of various forms that support structures may take consistently with the described methods and systems.

Examples of additively manufactured bodies of material from which plurality of discrete objects can be made include, but are not limited to, plates, slabs, blooms, billets, boards, blocks, among many other shapes, including curvilinear and multisided shapes, and any combination thereof, as set forth in further detail below. As for material(s) composing an additively manufactured body of material, the material(s) may be any suitable material(s), such as metal (solid, sintered, etc.), polymer (solid, foamed, etc.), composite, and multilayer material, among others. Fundamentally, there is no limitation on the composition of an additively manufactured body of material. An additively manufactured body of material may include at least one reference datum designed, configured, and located for precisely locating a stabilized workpiece relative to a manufacturing device, as described in further detail below. In an embodiment, and as described in further detail below, an additively manufactured body of material represents a "near net" discrete object that may share some geometric characteristics with a discrete object; for instance, an additively manufactured body of material may visually resemble a discrete object but lack threading, forming to a given tolerance, or one or more features more readily formed by subtractive manufacturing, for example. Additively manufactured body of material may be composed of a plurality of different materials.

A subtractive manufacturing process may be any suitable subtractive manufacturing process, such as, but not limited to, rotary-tool milling, electronic discharge machining, ablation, etching, erosion, cutting, and cleaving, among others. Fundamentally, there is no limitation on the type of subtractive manufacturing process(es) that may be used. In an example, differing subtractive manufacturing processes may be used before at different stages or to perform different steps of the subtractive manufacturing process as described below.

If rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In an embodiment, milling equipment used for removing material may be of the computerized numerical control (CNC) type that is automated and operates by precisely programmed commands that control movement of one or more parts of the equipment to effect the material removal. CNC machines, their operation, programming, and relation to CAM tools and CAD tools are well known and need not be described in detail herein for those skilled in the art to understand the scope of the present invention and how to practice it in any of its widely varying forms.

Subtractive manufacturing may be performed using spark-erosive devices; for instance, subtractive manufacturing may include removal of material using electronic discharge machining (EDM). EDM may include wire EDM, plunge EDM, immersive EDM, ram EDM, or any other EDM manufacturing technique. Subtractive manufacturing may be performed using laser-cutting processes. Subtractive manufacturing may be performed using water-jet or other fluid-jet cutting techniques. Fundamentally, any process for removal of material may be employed for subtractive manufacturing.

Referring now to FIG. 1, an exemplary method 100 of manufacturing a plurality of discrete objects from an additively manufactured body of material including at least a precursor to the plurality of discrete objects, at least an extension, and at least a reference feature is illustrated. It is noted that throughout the ensuing figures, each and every occurrence of elements such as certain spaces, precursors, features, discrete objects, reference features, and interconnecting portions are not labeled for convenience and to avoid cluttering the figures. However, at least some are labeled, and those skilled in the art will readily understand where these elements exist though they are unlabeled. At optional step 105, where the at least a precursor to the plurality of discrete objects includes a plurality of precursors to the plurality of discrete objects, at least an interconnecting feature that joins at least two of a plurality of precursors to a plurality of discrete objects is additively manufactured. At optional step 110, at least a reference feature on an additively manufactured body of material is additively manufactured. At step 115, an additively manufactured body of material including the at least a precursor to the plurality of discrete objects, the at least an extension, and the at least a reference feature is received. At step 120, the additively manufactured body of material is located within a manufacturing device using the at least a reference feature. At step 125, plurality of discrete objects are formed from the additively manufactured body of material by subtractive manufacturing. At 130, the plurality of discrete objects are removed from the manufacturing device.

Figure 2:
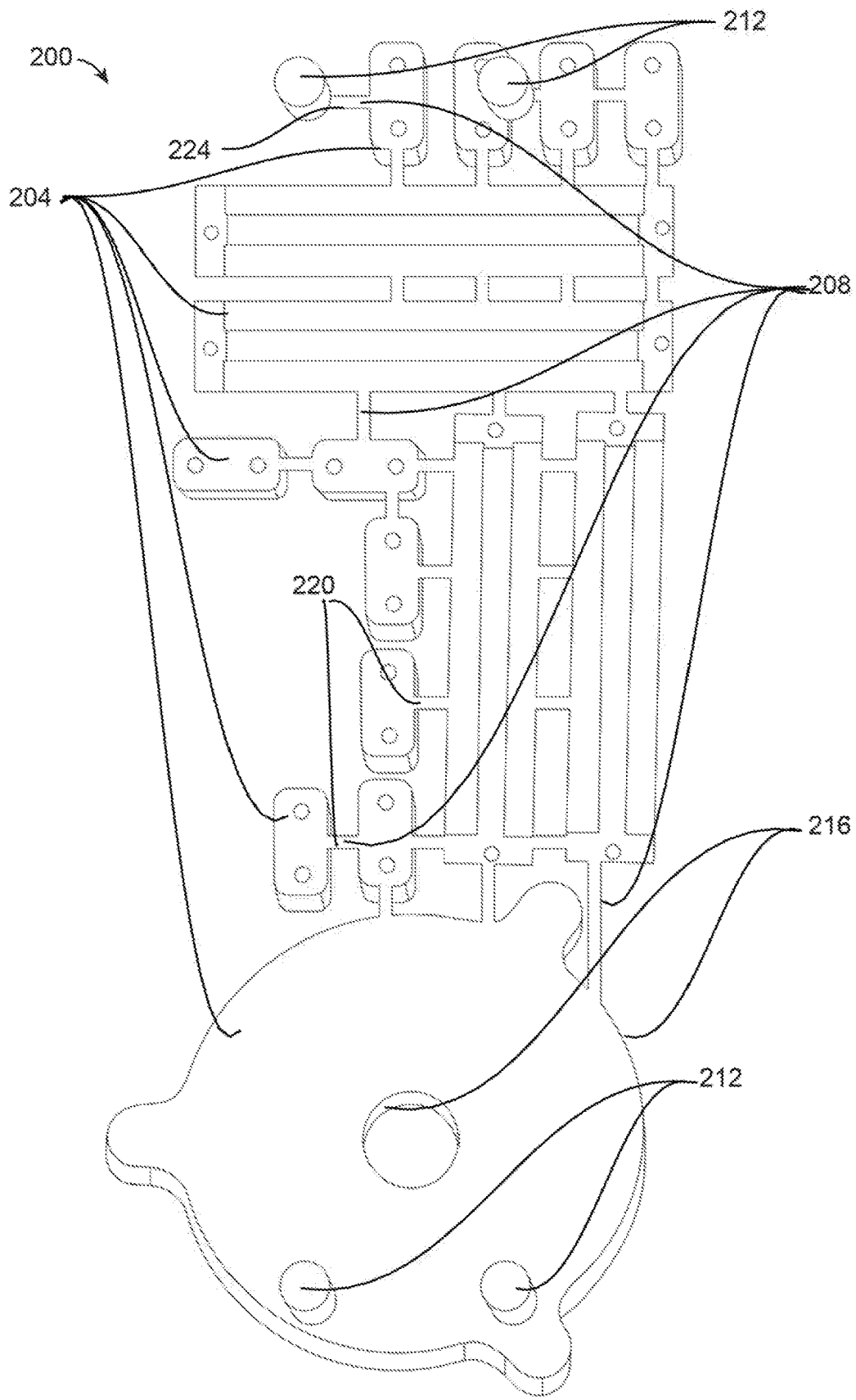

Referring now to FIG. 2, at step 115, an additively manufactured body of material 200 including the at least a precursor 204 to the plurality of discrete objects, the at least an extension 208, and the at least a reference feature 212 is received. Additively manufactured body of material 200 may be additively manufactured using any method or combination of methods of additive manufacturing described above and those methods of additive manufacturing readily appreciated by a person of ordinary skill in the art after reading this disclosure in its entirety. In an embodiment, additively manufacturing additively manufactured body of material 200 may include creating a computer model of additively manufactured body of material 200. Computer model of additively manufactured body of material 200 may be created by assigning a plurality of computer models of one or more differing structures to locations within a computer model of the body of material. Continuing with the description of an exemplary embodiment, this may be performed in any suitable manner, such as using CAD and/or CAM software having a graphical user interface that allows a user to manipulate graphical representations of the objects and/or body of material to effectively place or simulate one or more features of additively manufactured body of material 200 or of plurality of discrete objects. As part of steps 105, 110, or 115 or as part of another step in method 100 not specifically enumerated, computer model of additively manufactured body of material 200 may be configured into a CAM model that in later steps of method 100 will be used to guide the operation of one or more additive manufacturing devices to perform the necessary material deposition for forming additively manufactured body of material 200 in the proper number and sequence of steps.

Still referring to FIG. 2, additively manufactured body of material 200 includes at least a precursor 204 to plurality of discrete objects. At least a precursor 204 to plurality of discrete objects may include at least a geometric characteristic 216 of the plurality of discrete objects. At least a geometric characteristic 216 of plurality of discrete objects may be a feature, partial shape, or overall shape recognizable as similar to a feature, partial shape, or overall shape of at least a discrete object of the plurality of discrete objects. For instance, where a discrete object of the plurality of discrete objects, when completed, has a substantially disc-shaped form, at least a precursor 204 to the plurality of discrete objects may have a geometric characteristic 216 of the discrete object where the at least a precursor 204 to the plurality of discrete objects includes a substantially disc-shaped form. At least a precursor 204 to plurality of discrete objects may lack one or more features of the plurality of discrete objects, such as particular dimensions of the plurality of discrete objects, offset, beveled, flanged or otherwise varied features, surface recesses, grooves, or projections, or the like. Similarly, where plurality of discrete objects, when completed, includes one or more holes, at least a precursor 204 to the plurality of discrete objects may possess a geometric characteristic 216 of the plurality of discrete objects where the at least a precursor 204 to the plurality of discrete objects is additively manufactured already possessing at least a hole of the one or more holes; at least a hole in the at least a precursor 204 to the plurality of discrete objects may lack one or more features of at least a hole in the plurality of discrete objects, such as threading, a precise shape, dimensions, or broached features, or the like. At least a precursor 204 to plurality of discrete objects may include essentially all features of the plurality of discrete objects, except for a lack of surface, finish, tolerance, or flatness of surfaces. In some embodiments, at least a precursor 204 to plurality of discrete objects represents one or more "near net" discrete objects that share most geometric characteristics with one or more discrete objects of the plurality of discrete objects; for instance, the at least a precursor 204 to the plurality of discrete objects may visually resemble the plurality of discrete objects but lack threading, forming to a given tolerance, forming to a surface finish, forming to a flatness, or one or more features more readily formed by subtractive manufacturing. In an embodiment, additively manufactured body of material may have some degree of warping; for instance, where additively manufactured body of material was produced by a process such as laser powder-bed fusion or DMLS that involves rapid heating and cooling, warping may occur as a result of the repeated heating and cooling, particularly where a layer with a larger cross-sectional area is constructed on top of a layer with a smaller cross-sectional area. In an embodiment, warping may be predicted by a model for additively manufacture body of material; additively manufactured body of material may be constructed with a greater volume than a discrete object to be produced therefrom, permitting subtractive manufacturing to shape discrete object in a manner correcting warping.

Still referring to FIG. 2, as for the material composing precursor to a discrete object 204, the material may be any suitable material, such as metal (solid, sintered, etc.), polymer (solid, foamed, etc.), wood, composite, and multilayer material, among others. Precursor to a discrete object 204 may be a partially manufactured precursor to a discrete object 204; that is, the precursor to a discrete object 204 may be produced by performing one or more additive manufacturing steps to produce discrete object.

With continued reference to FIG. 2, where additively manufactured body of material has been constructed on, for instance, a base plate, additively manufactured body of material may be removed from base plate by severing one or more connections between additively manufacture body of material and base plate; for instance, additively manufactured body of material may be cut from base plate using wire EDM, a buzz saw, a CNC machine, or other means of cutting or severing material. Additively manufactured body of material may similarly be removed or cut from any other substrate on which additively manufactured body of material was deposited. One or more support features, such as one or more support features constructed to support additively manufactured body of material during additive manufacture, may be removed from additively manufactured body of material by any process described above for removal of material, including without limitation manual or automated processes. In an embodiment, where additive manufacturing has been performed on a base plate, the addition of reference features may make it possible to subtractively manufacture discrete object from multiple directions without having to machine away a base plate; for instance, reference features may be created for two or more machining angles, such that when removed from base plate precursor may be automatically set up at each machining angle using reference features.

In an embodiment, and still referring to FIG. 2, additively manufactured body of material may be manufactured from at least a first manufacturing orientation, and discrete object may be subtractively manufactured out of the additively manufactured body of material from at least a second manufacturing orientation; at least a second manufacturing orientation may be distinct from at least a first manufacturing orientation. To illustrate, at least a first manufacturing orientation may be selected to optimize additive manufacturing by (i) ensuring that portions having small cross-sectional areas are not used to support portions having large cross-sectional areas, (ii) ensuring that overhanging angles or surfaces are deposited at angles minimizing a need for support structures, and/or (iii) minimizing a total number of layers to be deposited to create a model. The first of these may reduce warping in metal additive manufacturing processes. As a non-limiting illustration, a capital letter "H" built from the feet up would be in danger of warping at the transition between the legs and the cross-bar of the "H"; if it is instead built from back to front, the cross-sectional area to be added with each layer remains constant. Further discussion the capital letter "H," building back-to-front would require essentially no support structures, while building from the feet up would require substantial support structures to support the cross-bar. Similarly, building from back to front can be accomplished using fewer layers, reducing the amount of powder that need be deposited; thus, several manufacturing goals in optimizing the manufacture of the capital letter "H" could be met by building from a back-to-front orientation. In more complex three-dimensional forms, there may not be a single orientation that optimizes several goals ideally in this way; persons skilled in the art, upon reviewing the entirety of this disclosure, will be aware of various approaches that may be employed to select an optimal orientation, based on desired attributes or goals of the manufacturing process.

Still viewing FIG. 2, at least a second orientation may be selected to maximize efficiency and/or accuracy of subtractive processes. For instance, at least a second orientation may be selected to minimize a number of set-ups for machining, to ensure that one or more holes may be bored effectively, to maximize the efficiency with which a given volume of material may be removed, or the like. At least a reference feature may thus be chosen to orient additively manufactured body of material, as described in further detail herein, in one or more orientations maximally efficient for subtractive manufacturing. Interrogation may be used to determine such orientations; alternatively or additionally, machine-control instructions may be generated for a plurality of possible orientations, and a set of orientations for manufacturing all features to form from a particular orientation may be selected from the plurality based on machine-control instructions minimizing runtime or otherwise optimizing the subtractive manufacturing process. Persons skilled in the art, upon reviewing the entirety of this disclosure, will be aware of various ways in which subtractive manufacturing orientations may be selected and/or optimized. In an embodiment, a user may specify the subtractive manufacturing orientations, and such orientations may be automatedly used to determine position of at least a reference feature in computer modeling processes as described in further detail below.

Still referring to FIG. 2, at least a precursor 204 to plurality of discrete objects may include a single precursor to a single discrete object of the plurality of discrete objects. At least a precursor 204 to plurality of discrete objects may include a single precursor to a plurality of discrete objects of the plurality of discrete objects; for instance, the at least a precursor 204 to the plurality of discrete objects may include a single object that is divided into two or more discrete objects during the subtractive manufacturing process of step 125. At least a precursor 204 to plurality of discrete objects may include a plurality of precursors, each precursor of the plurality of precursors a precursor to one or more discrete objects of the plurality of discrete objects; the plurality of precursors may include one precursor to each discrete object of the plurality of discrete objects. Persons skilled in the art, upon reading the entirety of this disclosure, will be aware of many alternative ways in which at least a precursor to a plurality of discrete objects may be implemented as contemplated in this disclosure.

Continuing to refer to FIG. 2, method 100 may include manufacturing at least a precursor 204 to plurality of discrete objects. For example, at an optional step not shown in FIG. 1, at least a precursor 204 to plurality of discrete objects may be additively manufactured; the at least a precursor 204 to the plurality of discrete objects may be additively manufactured using any method of additive manufacturing as described above. In some embodiments, additively manufacturing at least a precursor 204 to plurality of discrete objects includes creating a computer model of the at least a precursor 204 to the plurality of discrete objects, for instance as described in further detail below in reference to FIG. 13. Computer model of at least a precursor 204 to plurality of discrete objects may be created by assigning a plurality of computer models of one or more differing structures to locations within a computer model of the at least a precursor 204 to the plurality of discrete objects. This may be performed in any suitable manner, such as using CAD and/or CAM software having a graphical user interface that allows a user to manipulate graphical representations of plurality of discrete objects and/or at least a precursor 204 to the plurality of discrete objects to effectively place or simulate one or more features of the at least a precursor 204 to the plurality of discrete objects or of the discrete object. As part of step 105 or as part of another step in method 100 not specifically enumerated, computer model of precursor to a discrete object 204 may be configured into a three-dimensional model such as a CAM model, STL model, or the like that in later steps of method 100 will be used to guide the operation of one or more additive manufacturing devices to perform the necessary material deposition for forming precursor to a discrete object 204 in the proper number and sequence of steps. Computer model of at least a precursor 204 to plurality of discrete objects may be configured into a CAM model that in later steps of method 100 will be used to guide the operation of one or more additive manufacturing devices to perform the necessary material deposition for forming the at least a precursor 204 to the plurality of discrete objects in the proper number and sequence of steps. In other embodiments, at least a precursor 204 to plurality of discrete objects is manufactured using other manufacturing techniques, including without limitation any manufacturing process described above, or any combination of manufacturing processes described above. Additively manufacturing at least a precursor 204 to plurality of discrete objects may include additively manufacturing at least a geometric characteristic 216 of the plurality of discrete objects. In an embodiment, at least one structure of plurality of structures may be received from a third party, or reused.

Still referring to FIG. 2, additively manufactured body of material 200 includes at least an extension 208. At least an extension 208 may be constructed from any material or combination of materials suitable for the construction of additively manufactured body of material 200. In some embodiments, where at least a precursor 204 to plurality of discrete objects includes a plurality of precursors to the plurality of discrete objects, the at least an extension 208 includes at least an interconnecting feature 220 that joins at least two of the plurality of precursors to the plurality of discrete objects. At least an interconnecting feature 220 may join at least two of plurality of precursors to plurality of discrete objects to form a stabilized workpiece. In an embodiment, a stabilized workpiece is a workpiece each element of which is sufficiently immobilized throughout a manufacturing process to maintain integrity of a coordinate system used by a manufacturing device to compute manufacturing steps. Thus, in a stabilized workpiece, additively manufactured body of material 200, or at least a precursor 204 to plurality of discrete objects, does not fall out of the stabilized workpiece or shift its position within the stabilized workpiece during the subtractive manufacturing process of step 125. At least an interconnecting feature 220 may be constructed with sufficient strength and rigidity to resist forces exerted on stabilized workpiece during subtractive manufacturing. For instance, the at least an interconnecting feature 220 may include an element constructed as a bridge between two precursors of plurality of precursors to plurality of discrete objects; the element may be just thick enough, given the material out of which the element is constructed, to resist forces exerted on the element by subtractive manufacturing. Element may include cross-bracing or other structural features permitting the element to resist subtractive manufacturing forces with a minimum of material; where the element is made of higher-strength material, for instance the element may be constructed with a slimmer cross-sections, for instance to save on material costs or to make the overall manufacturing process more rapid. As a non-limiting example, at least an interconnecting portion may include one or more strips of material. Any two precursors of at least a precursor 204 to at least a discrete object may be connected by a single interconnecting portion or by a plurality of interconnecting portions. In an embodiment, bridging forms have a uniform thickness to aid in later removal as described in further detail below.

Figure 3A:
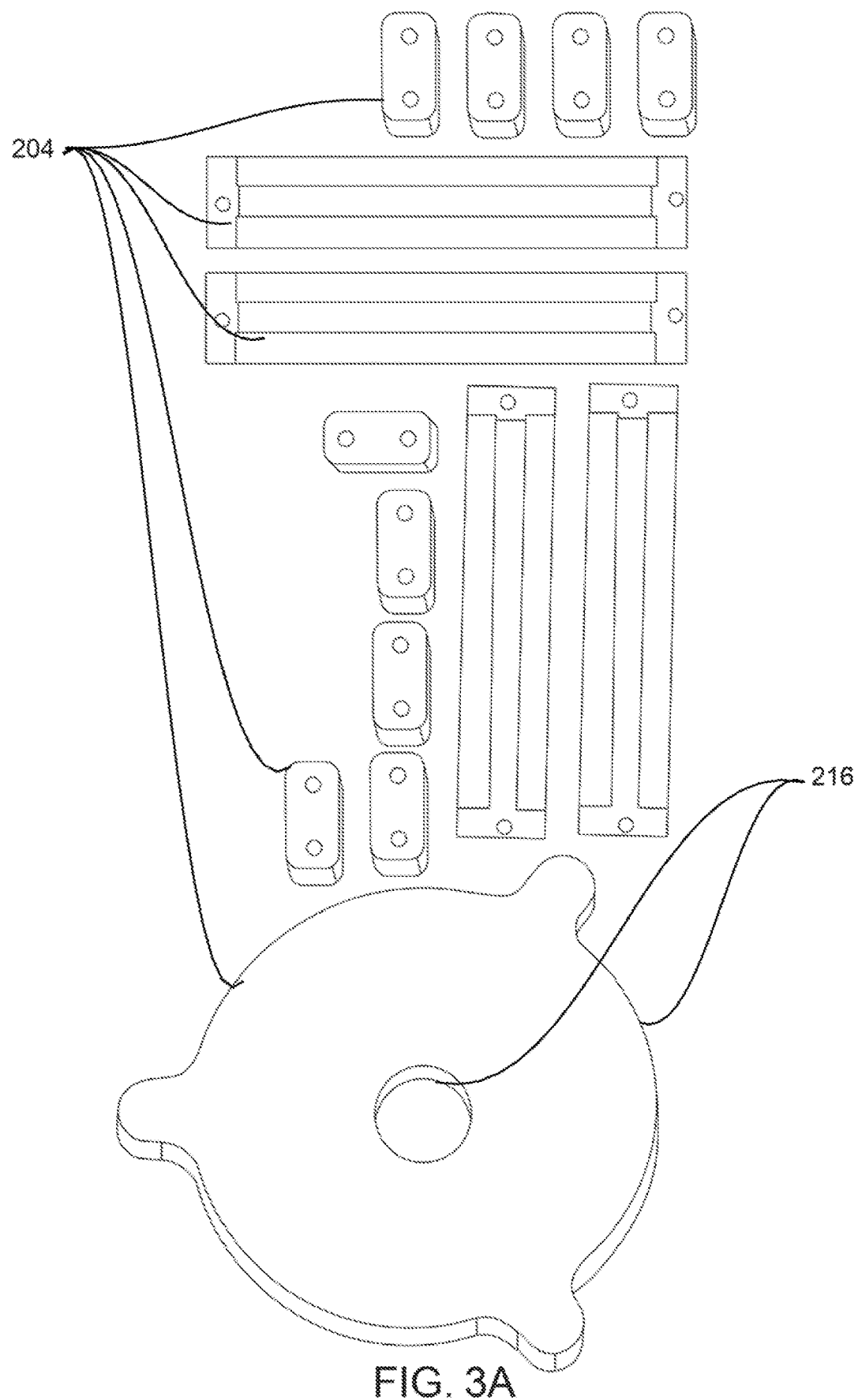
Figure 3B:
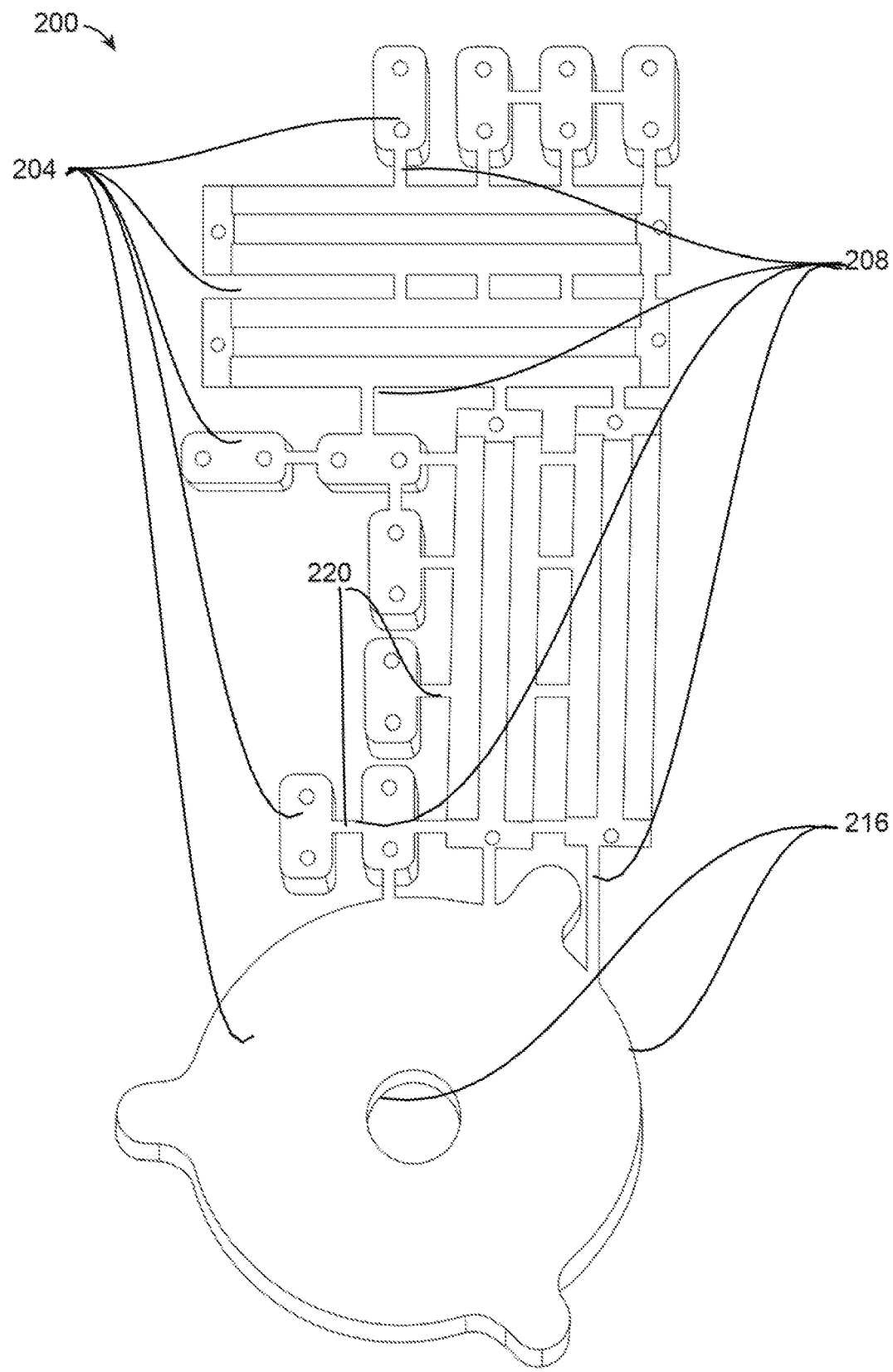

At optional step 105, and still referring to FIG. 2, at least an interconnecting feature 220 that joins at least two of a plurality of precursors to a plurality of discrete objects may be additively manufactured. At least an interconnecting feature 220 may be additively manufactured according to any process or combination of processes for additive manufacturing as described above. At least an interconnecting feature 220 may be manufactured as a function of plurality of precursors to plurality of discrete objects; for instance, at least an interconnecting feature 220 may be additively manufactured to have a first end attached to a first precursor of the plurality of precursors to the plurality of discrete objects and a second end attached to a second precursor of the plurality of precursors to the plurality of discrete objects. Plurality of precursors to plurality of discrete objects may be placed in a desired arrangement prior to manufacture of at least an interconnecting feature 220; for instance, plurality of precursors may be spaced apart sufficiently to allow amanufacturing device to perform subtractive manufacturing steps on the plurality of precursors to the plurality of discrete objects. Plurality of precursors to plurality of discrete objects may be additively manufactured in the same manufacturing process during which at least an interconnecting feature 220 is manufactured. FIG. 3A illustrates an exemplary embodiment of a plurality of precursors to plurality of discrete objects prior to the construction of at least an interconnecting feature 220. FIG. 3B illustrates an exemplary embodiment of a plurality of precursors to plurality of discrete objects after the manufacture of at least an interconnecting feature 220. It should be noted that plurality of precursors to plurality of discrete objects may be constructed in the same additive manufacturing process as at least an interconnecting feature 220, as well as before or after the construction of at least an interconnecting feature 220.

Continuing to refer to FIG. 2, the at least an extension 208 may include at least a support leg 220 extending from at least one of at least a precursor 204 to plurality of discrete objects. At least a support leg 220 may have any structure suitable for at least an interconnecting feature 220 as described above. At least a support leg 220 may be composed of any material or combination of materials suitable for the composition of at least an interconnecting feature 220. In an embodiment, at least a support leg 220 aids in locating additively manufactured body of material 200 as described in further detail below; for instance, the at least a support leg 220 may be used to connect additively manufactured body of material 200 to a temporary support frame as set forth in further detail below. At least a support leg 220 may enable placement of a reference feature of at least a reference feature 212 where otherwise no other element of additively manufactured body of material 200 would be present to support the reference feature; for instance, at least a precursor 204 to plurality of discrete objects and at least an interconnecting feature 220 may not be present at a location where a reference feature of at least a reference feature 212 is placed, for example to match a locating feature as described in further detail below. At least a support leg 220 may be additively manufactured. Where reference feature is manufactured as a function of at least a locating feature as described in further detail below, at least a support leg 220 may also be manufactured as a function of at least a locating feature.

Additively manufactured body of material 200 includes at least a reference feature 212. At least a reference feature 212 may be constructed of any material or combination of materials suitable for the construction of at least a precursor 204 to plurality of discrete objects. At least a reference feature 212 may be a feature designed, configured, and located for precisely locating additively manufactured body of material 200 relative to a manufacturing device. At least a reference feature may have any form conducive to locating additively manufactured body of material at manufacturing device as set forth in further detail below.

Figure 4:
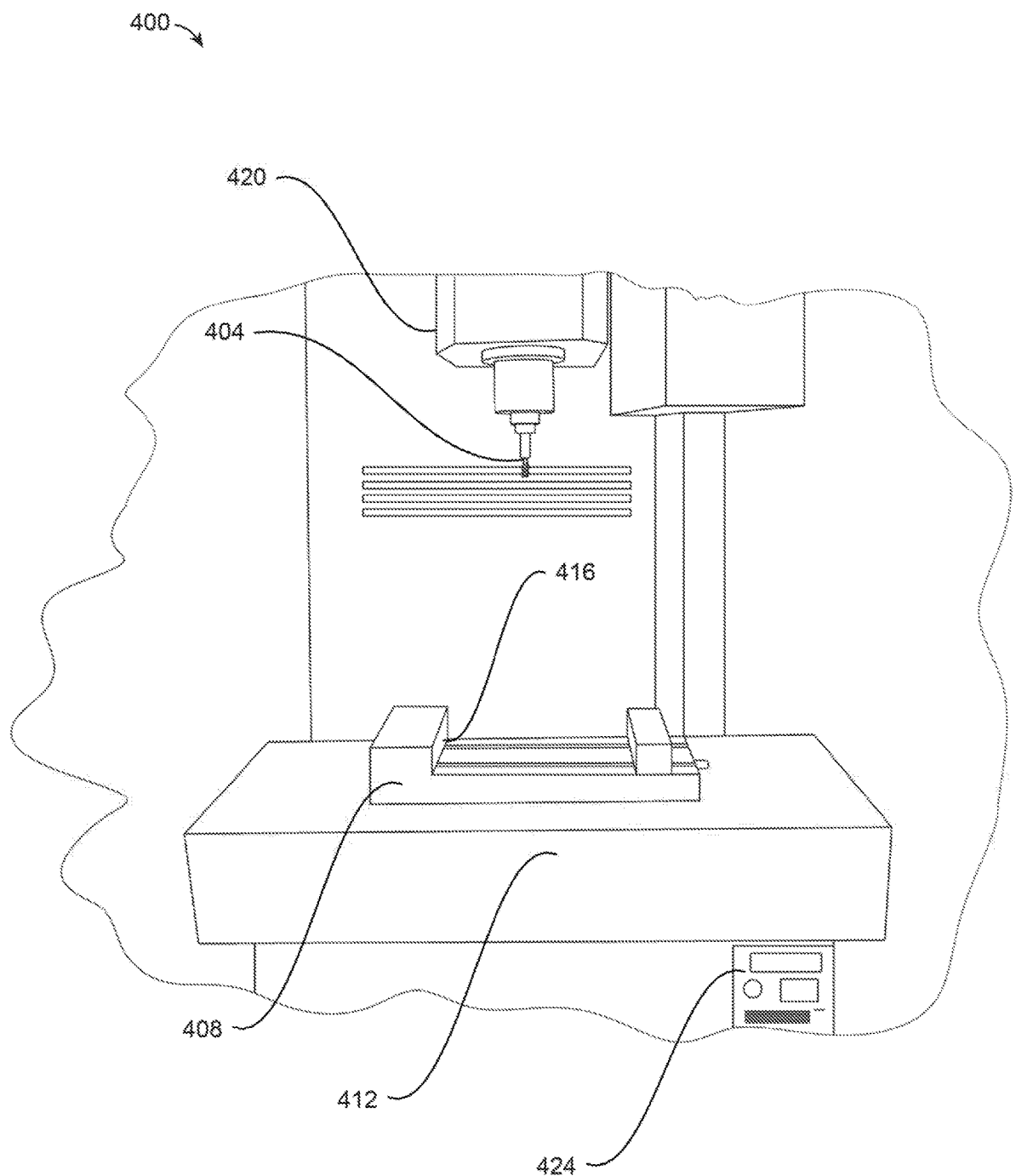

Referring now to FIG. 4, an exemplary embodiment of a manufacturing device 400 that may be used in some embodiments to perform one or more manufacturing or computer modeling steps in embodiments of methods is illustrated. Manufacturing device 400 may include at least a manufacturing tool 404; in an embodiment, manufacturing tool 404 may be a component ofmanufacturing device 400 that performs one or more subtractive manufacturing steps as described above. Manufacturing tool 204 may perform one or more subtractive manufacturing steps as described above. Manufacturing tool 404 may include a cutting tool. Cutting tool may be a component that removes material from a workpiece. In some embodiments, cutting tool includes at least an endmill, which may be a component that removes material when rotated against a workpiece. Persons skilled in the art will be aware of many variants of endmill that may be used to remove material from a workpiece. Cutting tool may include a component that transfers motion from a motor (not shown) to at least an endmill; as a non-limiting example, component may be a spindle that rotates and as a result causes endmill to rotate. Manufacturing tool 404 may include a tool changer that can switch a plurality of endmills onto and off of manufacturing tool 404; for instance, tool changer may detach an endmill currently attached to a spindle and attach a different endmill to the same spindle, enabling the automated manufacturing device to use more than one endmill in a single automated manufacturing process. Manufacturing tool 404 may include a tool changer that can switch a plurality of endmills onto and off of manufacturing tool 404. Manufacturing tool 404 may include a component used to perform EDM, such as a wire for wire EDM or an electrode. Manufacturing tool 404 may include one or more lasers. Manufacturing tool 404 may include one or more abraders.

Alternatively or additionally, manufacturing tool 404 may include at least an additive manufacturing tool capable of performing one or more additive manufacturing steps as described above. Manufacturing tool 404 may, as a non-limiting example, include one or more additive printer heads such as those used in rapid prototyping and/or "3D printing" processes, or the like. Manufacturing tool 404 may include an extruding device for extruding fluid or paste material, a sprayer or other applicator for bonding material, an applicator for powering, a sintering device such as a laser, or other such material. Furthermore, discrete object may be formed from precursor to a discrete object 204 by additive manufacturing.

Still referring to FIG. 4, manufacturing device 400 may include a support 408. In an embodiment, a support 408 may be a structure that supports a workpiece during the one or more manufacturing steps. Support 408 may include a base table 412. Base table 412 may include a surface to which a workpiece or other components may be secured. Surface may be oriented horizontally, vertically, or in any other orientation. Surface may be substantially planar. Base table 412 may include various mechanisms to attach components or workpieces to base table 412; for instance, base table 412 may include a quick release attachment mechanism that can be used to attach any component having appropriate attachment features such as quick-release studs. Support 408 may include a fixture, which as used herein is a component used in a manufacturing device to secure a workpiece to the manufacturing device during the one or more manufacturing steps. A fixture may include, without limitation, one or more clamps, fasteners, vices, bolts, studs, quick-release attachment devices, straps, and chucks. A fixture may be one element of a set of fixtures; for instance, a workpiece may be secured in manufacturing device 400 by a plurality of fixtures, such as a plurality of bolts. Support 408 may include a vise, clamp, or other component used to locate or immobilize a workpiece within or at manufacturing device 400. Support 408 may include a temporary support frame as described in further detail below.

Still referring to FIG. 4, support 408 may include a substrate for deposition of layers in additive processes. Substrate may be constructed of any material suitable for an additive process to be performed on top of substrate. For instance, and without limitation, substrate may include a metal or other heat-resistant base plate supporting additively added layers in metal additive processes such as DMLS or other laser sintering. Substrate may include a tray structure, e.g. for keeping powder layers used in powder fusion processes from blowing away or spilling during deposition. Substrate may include a fluid bath or other structure for bathing or coating a workpiece with successive layers, as in stereolithography or the like.

With continued reference to FIG. 4, manufacturing device 400 may include at least a locating feature 416. In an embodiment, at least a locating feature 416 may be at least a feature of manufacturing device 400 that enables a workpiece to be located at manufacturing device 400; in some embodiments, the at least a locating feature 416 enables a workpiece to be located precisely with regard to a coordinate system used to direct the one or more steps. At least a locating feature 416 may include, without limitation, one or more vices, clamps, projections, slots, recesses, or walls; for instance, the at least a locating feature 416 may include a surface of a vise jaw that is immobile with respect to another component such as a support 408 or base table 412, enabling precise prediction of surface's location, and thus of a workpiece surface set against it. At least a locating feature 416 may include a locating feature 416 on support 408; for example, the at least a locating feature 416 may include a bolt-hole, stud-hole, groove, or other recess in a rotary table, base table 412, trunnion table, or fixture. As a non-limiting example, at least a locating feature 416 may include one or more grooves in a vice. At least a locating feature 416 may include a projection on a rotary table, base table 412, trunnion table, or fixture. At least a locating feature 416 may include a combination of recesses and projections. The at least a locating feature 416 may include a plurality of locating features, or a single locating feature.

Continuing to refer to FIG. 4, in an embodiment, manufacturing device 400 may be a mechanical manufacturing device. In an embodiment, mechanical manufacturing device may be a manufacturing device 400 that deprives the user of some direct control over the toolpath, defined as movements the manufacturing tool 404 and workpiece make relative to one another during the one or more manufacturing steps. For instance, manufacturing tool 404 may be constrained to move vertically, by a linear slide 420 or similar device, so that the only decision the user may make is to raise or lower the manufacturing tool 404; as a non-limiting example, where manufacturing device 400 is a manually operated machine tool, user may only be able to raise and lower a cutting tool, and have no ability to move the cutting tool horizontally. Similarly, where manufacturing tool 404 includes a slide lathe, a blade on the slide lathe may be constrained to follow a particular path. As a further example, base table 412 may be moveable along one or more linear axes; for instance, base table 412 may be constrained to move along a single horizontal axis. In other embodiments, base table 412 is constrained to movement along two horizontal axes that span two dimensions, permitting freedom of movement only in a horizontal plane; for instance, base table 412 may be mounted on two mutually orthogonal linear slides.

With continued reference to FIG. 4, manufacturing device 400 may include a powered manufacturing device. In an embodiment, a powered manufacturing device may be a manufacturing device in which at least one component of the manufacturing device includes at least a component powered by something other than human power. At least a component may be powered by any non-human source, including without limitation electric power generated or stored by any means, heat engines including steam, internal combustion, or diesel engines, wind power, water power, pneumatic power, or hydraulic power. Powered components may include any components of manufacturing device 400. Manufacturing tool 404 may be powered; for instance, manufacturing tool 404 may include an endmill mounted on a spindle rotated by a motor (not shown). Workpiece support 408 may be powered. Where manufacturing device 400 is a mechanical device, motion of components along linear or rotary constraints may be powered; for instance, motion of base table 412 along one or more linear constraints such as linear slides may be driven by a motor or other source of power. Similarly, rotation of rotary table may be driven by a power source. Tool-changer, where present, may be driven by power. In some embodiments, all or substantially all of the components of manufacturing device 400 are powered by something other than human power; for instance, all components may be powered by electrical power.

Still referring to FIG. 4, manufacturing device 400 may include an automated manufacturing device. In some embodiments, an automated manufacturing system is a manufacturing device including a controller 424 that controls one or more manufacturing steps automatically. Controller 424 may include a sequential control device that produces a sequence of commands without feedback from other components of manufacturing device. Controller 424 may include a feedback control device that produces commands triggered or modified by feedback from other components. Controller 424 may perform both sequential and feedback control. In some embodiments, controller 424 includes a mechanical device. In other embodiments, controller 424 includes an electronic device. Electronic device may include digital or analog electronic components, including without limitation one or more logic circuits, such one or more logic gates, programmable elements such as field-programmable arrays, multiplexors, one or more operational amplifiers, one or more diodes, one or more transistors, one or more comparators, and one or more integrators. Electronic device may include a processor. Electronic device may include a computing device. Computing device may include any computing device as described below in reference to FIG. 20.

Continuing to refer to FIG. 4, controller 424 may include a component embedded in manufacturing device 400; as a non-limiting example, the controller 424 may include a microcontroller, which may be housed in a unit that combines the other components of manufacturing device 400. Further continuing the example, microcontroller 424 may have program memory, which may enable microcontroller 424 to load a program that directs manufacturing device 400 to perform an automated manufacturing process. Similarly, controller 424 may include any other components of a computing device as described below in reference to FIG. 20 in a device housed within manufacturing device 400. In other embodiments, controller 424 includes a computing device that is separate from the rest of the components of manufacturing device 400; for instance, the controller 424 may include a personal computer, laptop, or workstation connected to the remainder of manufacturing device 400 by a wired or wireless data connection. In some embodiments, controller 424 includes both a personal computing device where a user may enter instructions to generate a program for turning workpiece into a finished product, and an embedded device that receives the program from the personal computing device and executes the program. A person of ordinary skill in the art will readily appreciate, after reading the instant application in its entirety, the various ways that a controller 424, which may include one or more computing devices, may be connected to or incorporated in a manufacturing device 400 as described above.

With continued reference to FIG. 4, controller 424 may control components of manufacturing device 400; for instance, controller 424 may control elements including without limitation tool changer to switch endmills, spindle or gear systems operatively coupled to spindle to regulate spindle rotational speed, linear movement of manufacturing tool 404, base table 412, or both, and rotation or rotational position of rotary table. As an example, in embodiments involving subtractive manufacturing, the equipment used for removing material may be of the computerized numerical control (CNC) type that is automated and operates by precisely programmed commands that control movement of one or more parts of the equipment to effect the material removal. CNC machines, their operation, programming, and relation to computer aided manufacturing (CAM) tools and computer aided design (CAD) tools are well known and need not be described in detail herein for those skilled in the art to understand the scope of the present invention and how to practice it in any of its widely varying forms. Persons skilled in the art, upon reading the entirety of this disclosure, will be aware of similar automated control systems usable for various forms of additive manufacturing.

Figure 13:
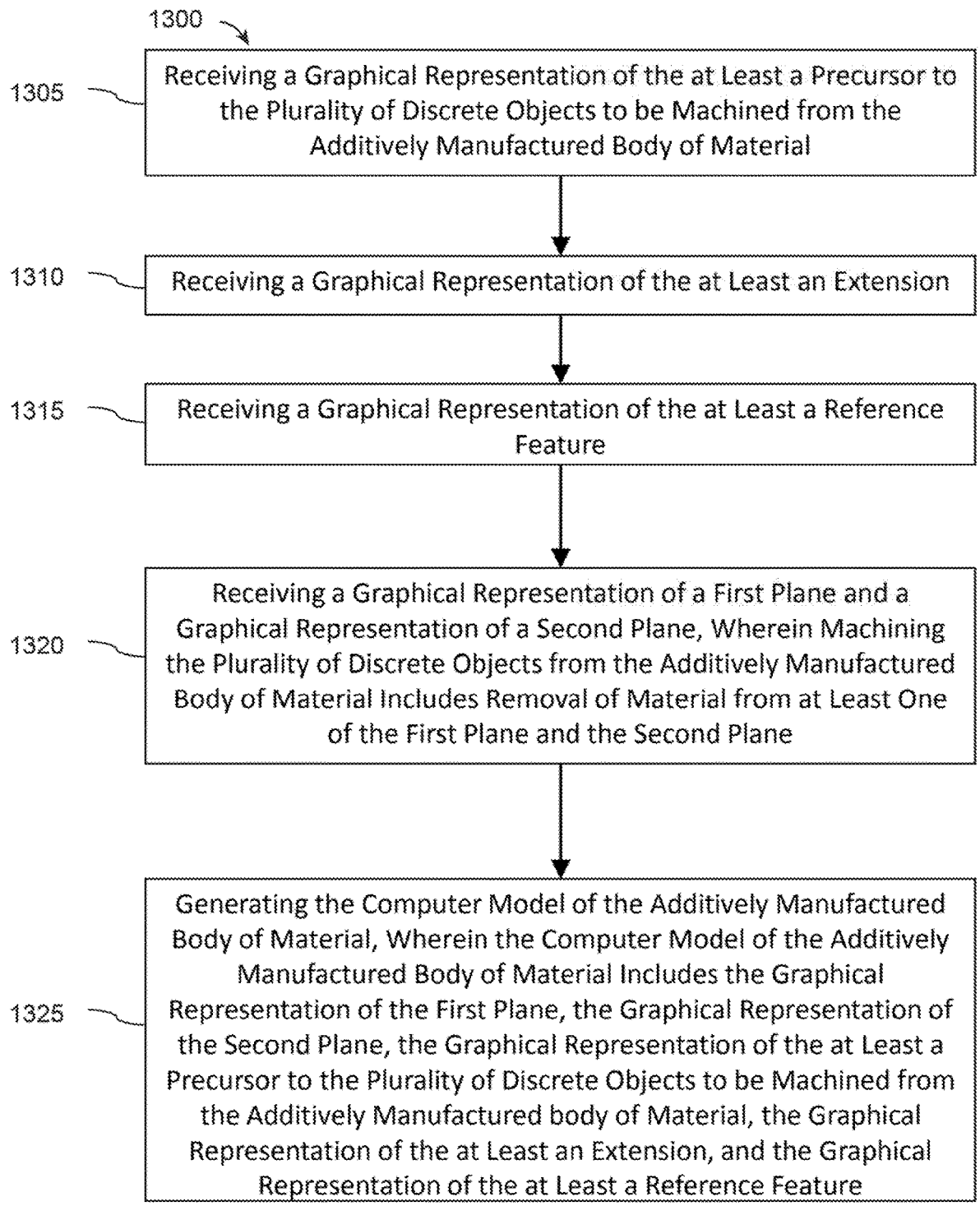
FIG. 13 is a flow diagram illustrating an exemplary method of generating a computer model of an additively manufactured body of material in accordance with an embodiment.
Figure 18:
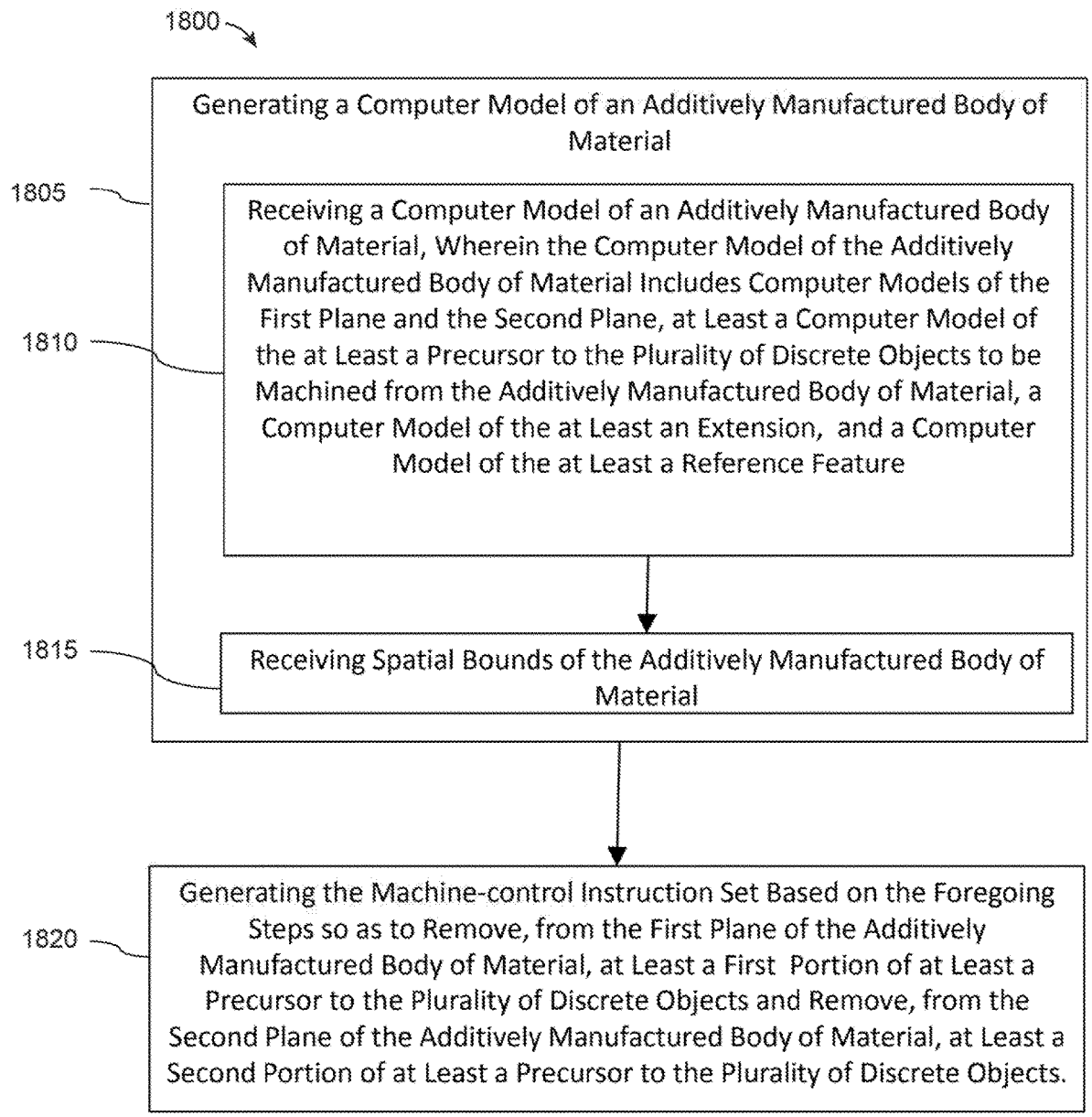
FIG. 18 is a flow diagram illustrating an exemplary method of generating a machine-control instruction set adapted to control machining equipment to machine a plurality of discrete objects from an additively manufactured body of material in accordance with an embodiment.

Still referring to FIG. 4, controller may be configured to perform any manufacturing modeling and/or other method step as disclosed herein, including without limitation as described herein in reference to FIGS. 1, 13, 18, and/or 19. In an embodiment, controller 424 is configured to receive a graphical representation of precursor to a discrete object, receive a graphical representation of at least a reference feature on the precursor to the discrete object, and generate a computer model of the body of material, wherein the computer model of the body of material includes the graphical representation of the precursor to the discrete object and the graphical representation of the at least a reference feature.

Although the method has been described for exemplary purposes regarding a manufacturing device 400, embodiments of the method making use of an additive manufacturing device are also contemplated within the scope of this disclosure. For instance, a manufacturing tool 404 may be any device that modifies a workpiece to produce a product. A manufacturing tool 404 may include an applicator or other additive device. As an example, manufacturing tool 404 may include a printer head for a 3D printer. Manufacturing tool 404 may include an extruding device for extruding fluid or paste material, a sprayer or other applicator for bonding material, an applicator for powering, a sintering device such as a laser, or other such material. Furthermore, discrete object may be formed from precursor to a discrete object 404 by additive manufacturing.

Figure 5:
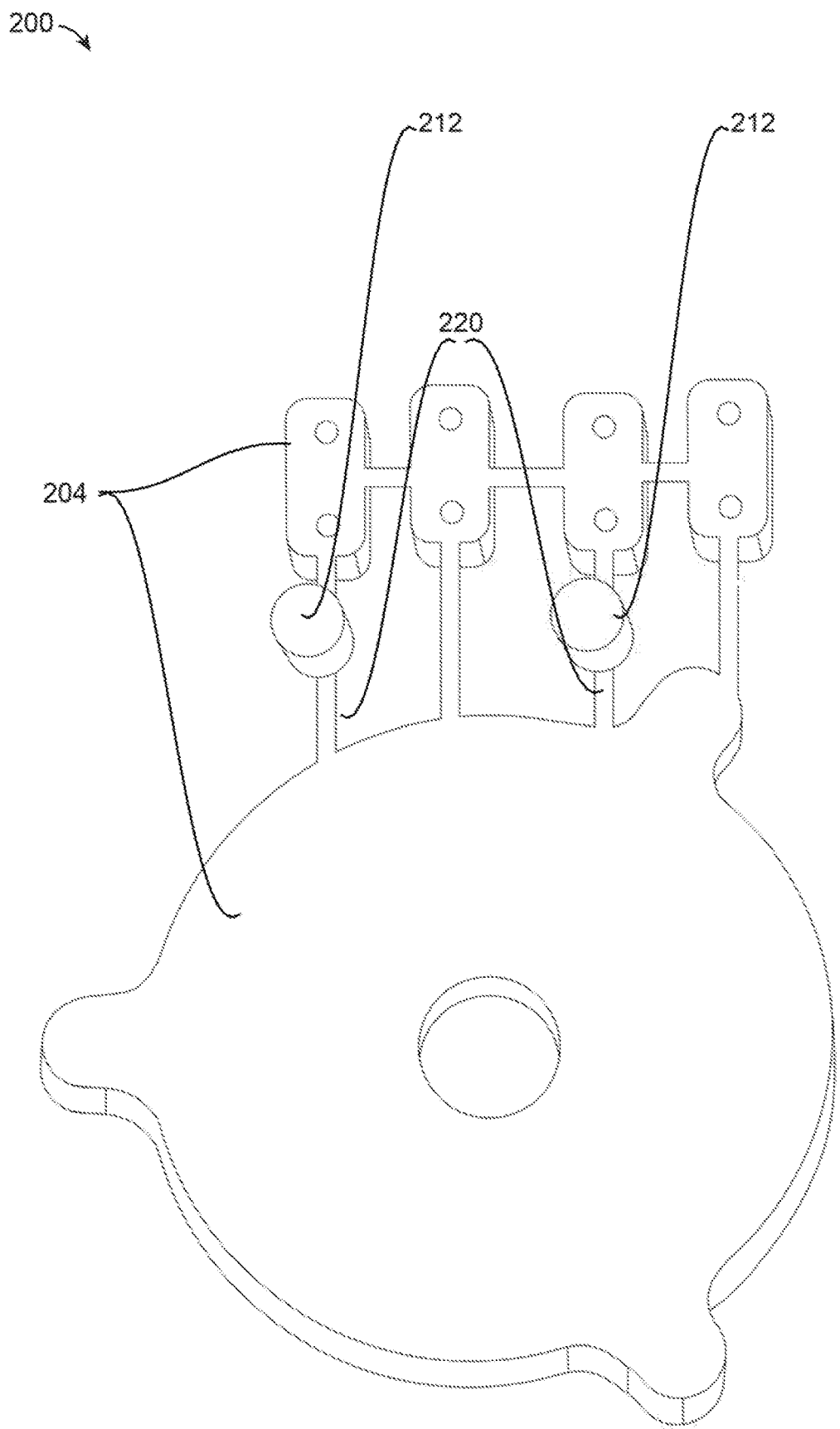

Referring again to FIG. 2, at least a reference feature 212 may be located on at least one of at least a precursor 204 to plurality of discrete objects. At least a reference feature 212 may be located on at least an extension 208. For instance, as shown for example in FIG. 2, at least a reference feature 212 may be located on at least a support leg 220. At least a reference feature 212 may be located on a distal end of at least a support leg 220, as shown for instance in FIG. 2, or on any other part of support leg. At least a reference feature 212 may be located on an interconnecting feature 220, as shown for example in FIG. 5. At least a reference feature 212 may be located on any combination of at least a precursor 204 to plurality of discrete objects, interconnecting features 220, or support legs; for instance, a single reference feature of at least a reference feature 212 may be located partially on a precursor and partially on an extension. A first reference feature of at least a reference feature 212 may be located on a precursor while a second reference feature of the at least a reference feature 212 may be located on an extension; persons of skill in the art, upon reading the entirety of this disclosure, will be aware of the various possible locations on additively manufactured body of material 200 where at least a reference feature 212 may be located. In an embodiment, at least a reference feature 212 may be placed on additively manufactured body of material 200 as needed to locate the additively manufactured body of material 200; for instance, the at least a reference feature 212 may be located on the additively manufactured body of material 200 to match at least a locating feature as set forth in further detail below. At least a reference feature 212 may have been added to precursor to discrete object through additive manufacturing, for instance as described below for additively manufacturing at least a reference feature 212 on precursor to discrete object. For instance, and without limitation, at least a reference feature 212 may have been added to precursor to discrete object by generating a computer model of the at least a reference feature 212 and additively manufacturing the at least a reference feature 212 as a function of the computer model; this may be implemented for example as described in further detail below.

At least a reference feature 212 may locate additively manufactured body of material 200 relative to manufacturing device 400 by fitting the at least a reference feature 212 to at least a locating feature 416 of the manufacturing device 400. For instance, at least a reference feature 212 may include one or more projections that fit into one or more recesses in a support 408 at manufacturing device 400; as a non-limiting example, where at least a locating feature 416 includes a plurality of holes, such as bolt-holes or stud-holes, the at least a reference feature 212 may include a plurality of projections that fit into the plurality of holes. Where at least a locating feature 416 includes at least a projection, at least a reference feature 212 may include at least a recess (not shown) into which at least a projection may be housed. In some embodiments, at least a reference feature 212 includes an attachment feature, such as one or more holes to admit bolts or studs, or one or more projections or recesses that fit a locating feature 416 of manufacturing device 400. At least a reference feature 212 may include one or more recesses, which may fit over one or more projections at manufacturing device 400.

Figure 6:
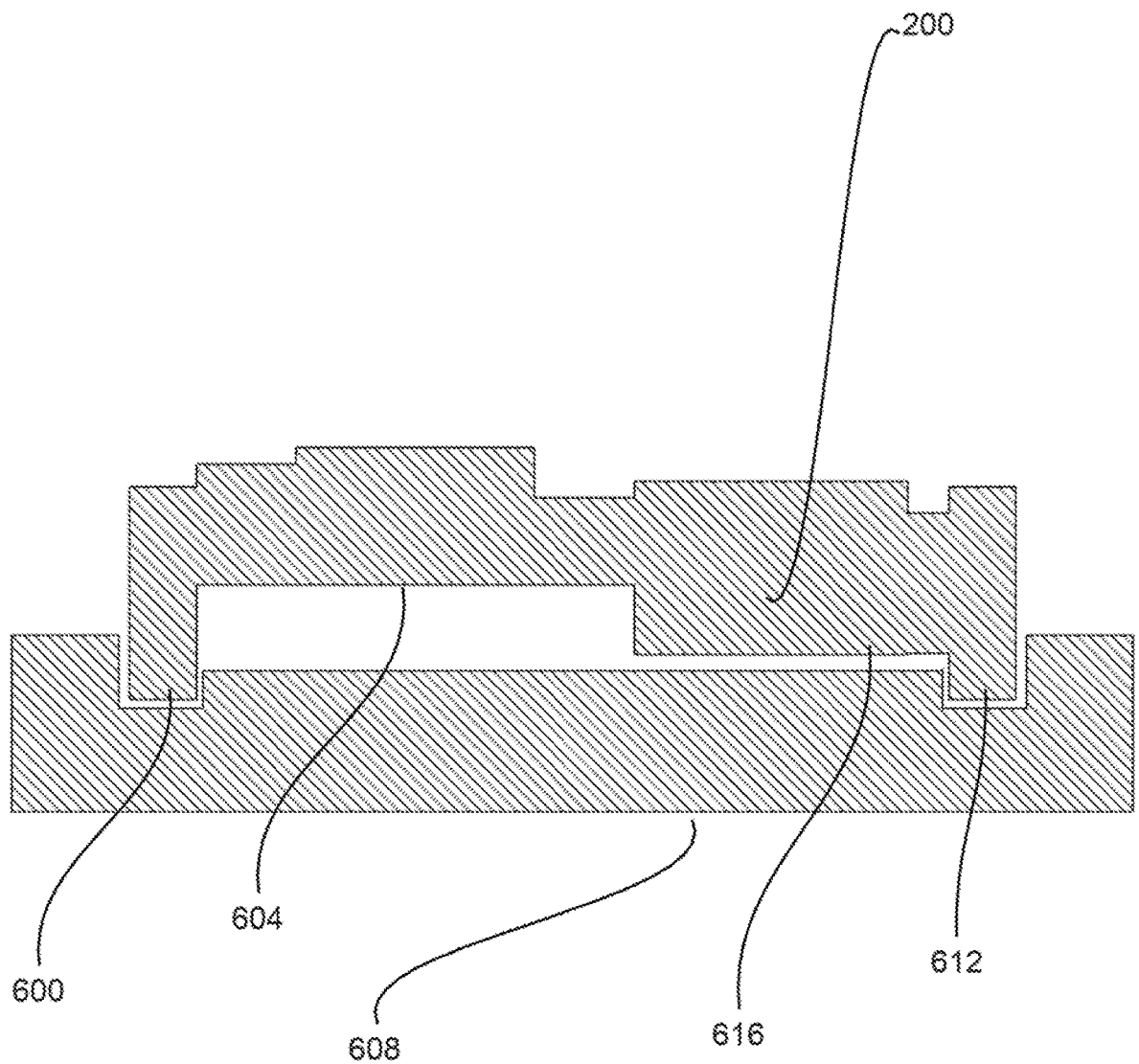

In an embodiment, as illustrated for example in FIG. 6, at least a reference feature 212 may include a first reference feature 600 that extends further from a first surface 604 of a bottom of additively manufactured body of material 200 that is further from an element 608 of manufacturing device 400, which may be a support 408 or a locating feature 416, when additively manufactured body of material 200 is in an orientation used to perform some manufacturing steps of step 125, and a second reference feature 612 that extends less far from a second surface 616 that is closer to the element 608 when the additively manufactured body of material 200 is in the orientation used to perform the manufacturing steps. Thus, for instance, where element 608 of secondary manufacturing device has a shape not formed to complement the shape of additively manufactured body of material 200, at least a reference feature 212 may include first 604 and second 612 reference feature that orient additively manufactured body of material 200 to a discrete object in an expected orientation for one or more manufacturing steps; this may enable the use of a standard-shaped fixture or other support 408 with various differently shaped bodies of material.

Support 408 may be constructed to fit the shape of a particular additively manufactured body of material 200. For instance, where additively manufactured body of material 200 is oriented with a bottom side oriented to rest on a support 408 so that an opposite surface may be subjected to subtractive manufacturing, the bottom side may have surfaces at distinct heights with regard to support 408; in other words, a first surface may be at a distinct height from a second surface. In an embodiment, an element of manufacturing device 400, which may be a support 408, may have corresponding surfaces that support surfaces of bottom. Corresponding surfaces may include locating features, which may be any locating features 416 as described above, to which first feature and second feature may be fitted to locate additively manufactured body of material 200. Surfaces at different heights with respect to support 408 may have reference features of at least a reference feature 212 that orient the surfaces with respect to corresponding surfaces on support 408, for instance using locating features.

Support 408 may be configured, manufactured, or adjusted to complement a shape of additively manufactured body of material 200.

Figure 7A:
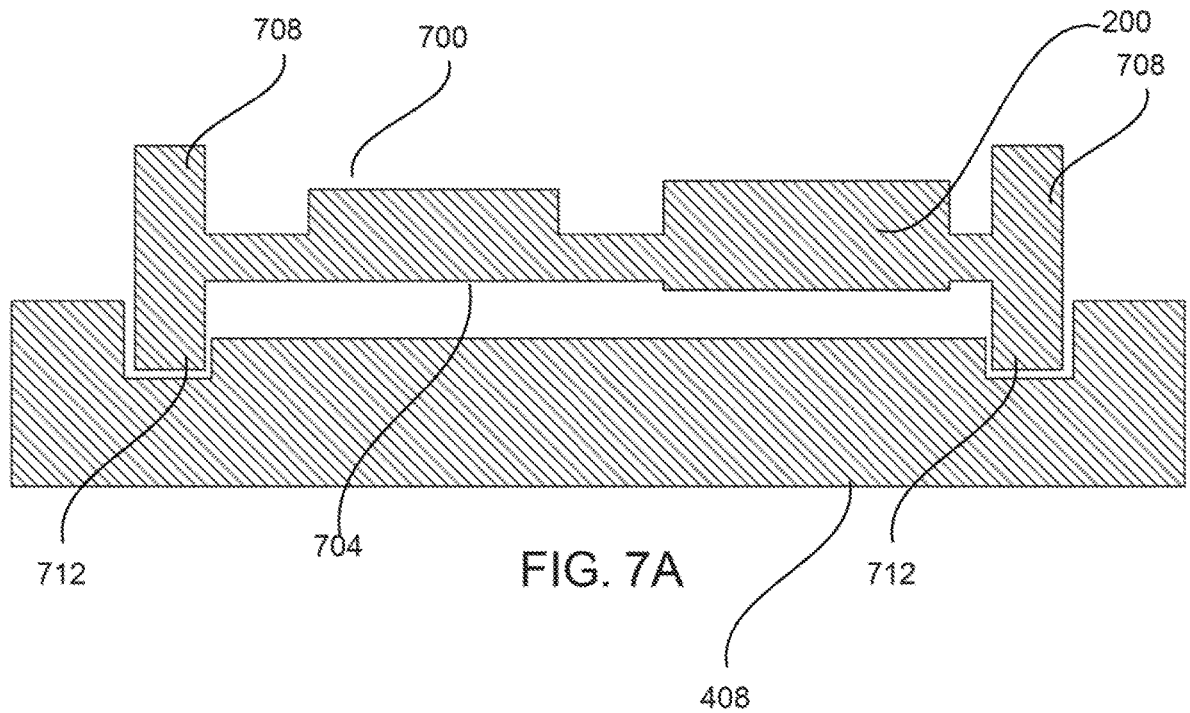
Figure 7B:
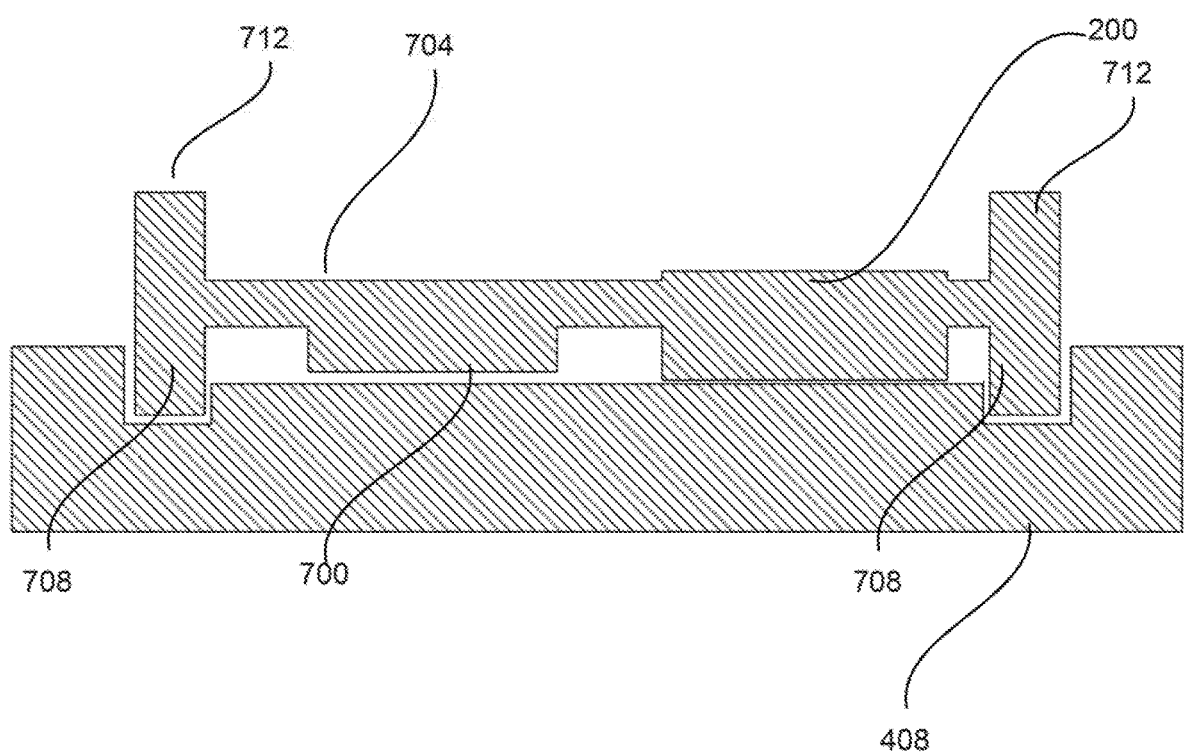

Referring now to FIG. 7A, additively manufactured body of material 200 may include a first side 700 that faces a support, which may be any support 408, when additively manufactured body of material 200 is in a first orientation, and a second side 704 that faces support 408 when additively manufactured body of material 200 is in a second orientation. At least a reference feature 212 may include at least a first-side reference feature 708 on first side 700 and at least a second-side reference feature 712 on second side 704. In an embodiment, and as shown for example in FIG. 7A, at least a first-side reference feature 708 may locate additively manufactured body of material 200 within manufacturing device 400, for instance by locating the additively manufactured body of material 200 at support 408, when the additively manufactured body of material 200 is in first orientation; as shown in FIG. 7B, at least a second-side reference feature 712 may locate additively manufactured body of material 200 within manufacturing device 400, for instance by locating the additively manufactured body of material 200 at support 408, when the additively manufactured body of material 200 is in second orientation. In an embodiment, the at least a first-side reference feature 708 and the at least a second-side reference feature 712 enable additively manufactured body of material 200 to be located at the same fixture, support 408, or other element of manufacturing device 400 in different orientations. Additional sets of reference features on additional sides of additively manufactured body of material 200 may enable location of additively manufactured body of material 200 in additional orientations.

Referring again to FIG. 1, at optional step 110, at least a reference feature 212 on an additively manufactured body of material 200 is additively manufactured. For instance as illustrated for in FIGS. 3A-B above, additively manufactured body of material 200 may be received without at least one of the at least a reference feature 212. At least a reference feature 212 may be additively manufactured any part of additively manufactured body of material 200.

In an embodiment, at least a reference feature 212 may be manufactured as a function of at least a locating feature 416 at or within manufacturing device 400; at least a reference feature 212 may be additively manufactured to fit to at least a locating feature 416 by receiving additive manufacturing control commands directing the additive manufacture of the at least a reference feature 212. For instance, where at least a locating feature 416 includes a recess, at least a reference feature 212 may be additively manufactured having at least a projection that fits into the recess. As another example, where locating feature 416 includes a projection, at least a reference feature 212 may be additively manufactured having at least a recess that fits over the projection. Additive manufacturing control commands may be generated using one or more data describing locating feature 416; one or more data may include dimension, size, or shape data concerning locating feature 416. Additive manufacturing control commands may be generated using a computer model or graphical representation of a locating feature 416 at manufacturing device 400; additive manufacturing may be performed as a function of computer model of the locating feature 416. Additive manufacturing control commands may be generated using a computer model or graphical representation of at least a reference feature 212; additive manufacturing may be performed as a function of computer model of the at least a reference feature 212. Computer model of at least a reference feature 212 may be combined with or created by reference to a computer model of precursor to discrete object, for example as described in further detail below in reference to FIG. 13.

Still referring to FIG. 1, at least an extension 208 may also be additively manufactured as a function of at least a locating feature 416. For instance, where orientation of additively manufactured body to perform additive manufacturing process of step 125 would suggest placement of a reference feature of at least a reference feature 212 in a location that is not on at least a precursor 204 to plurality of discrete objects, for instance because one locating feature of at least a locating feature 416 is opposite a gap between or a space beyond the at least a precursor 204 to the plurality of discrete objects, an extension of the at least an extension 208 may be constructed to provide support for the reference feature, and to connect the reference feature to the rest of the additively manufactured body of material 200.

Figure 8:
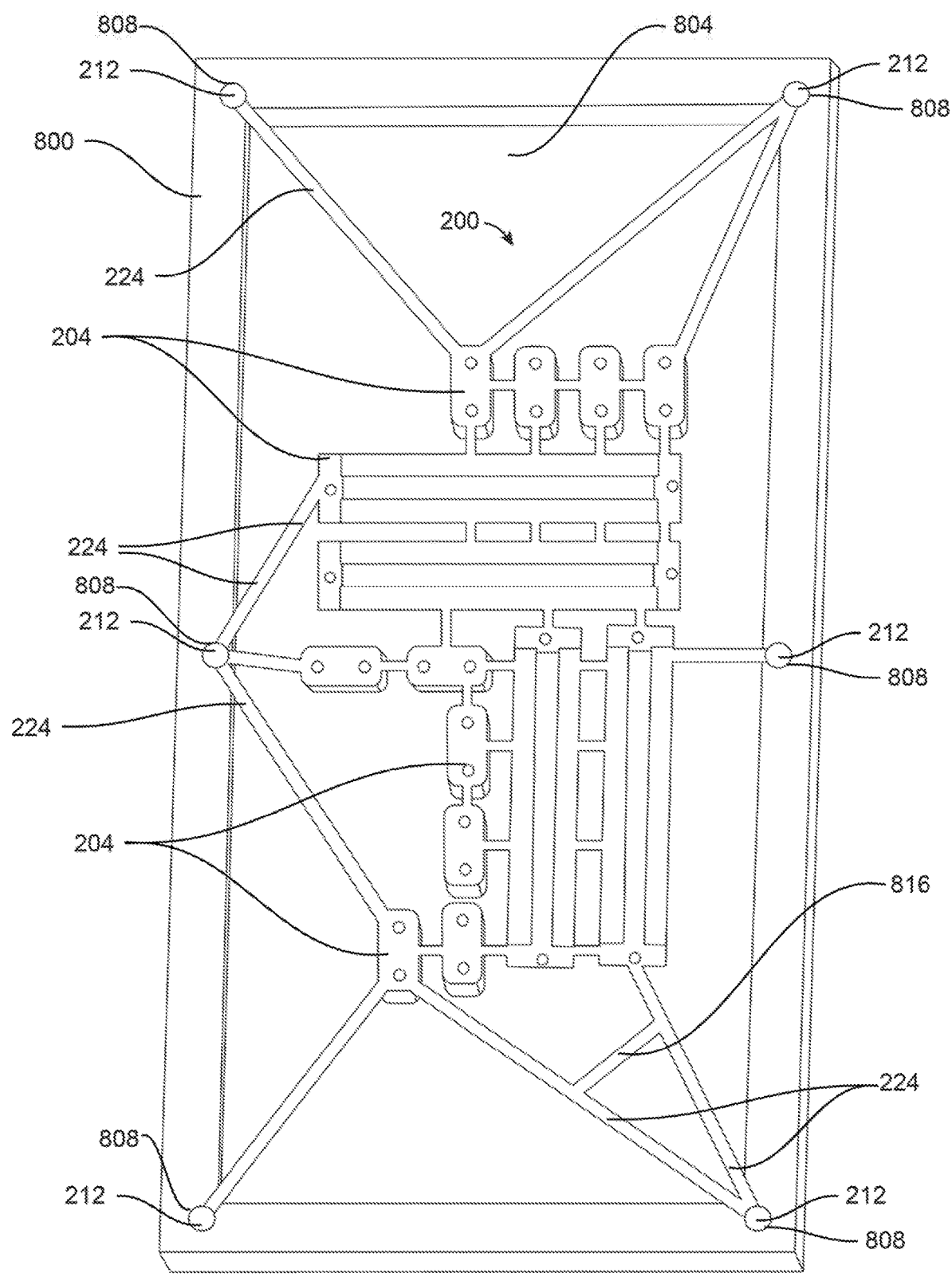

Referring now to FIG. 8, an exemplary embodiment in which a temporary support frame 800 is used is illustrated. Temporary support frame 800 may be constructed out of any suitable material or combination of materials, including without limitation metal (solid, sintered, etc.), wood, cardboard, polymer (solid, foamed, etc.), composite, and multilayer material, among others. Fundamentally, there is no limitation on the composition of temporary support frame 800. Temporary support frame 800 may be constructed from a combination of various elements; for instance, the temporary support frame 800 may include a combination of brass, plastic, and aluminum parts. In an embodiment, temporary support frame 800 is constructed from the same material as additively manufactured body of material 200. Temporary support frame 800 may be additively manufactured.

Still viewing FIG. 8, temporary support frame 800 may include at least an opening 804. At least an opening 804 may include a single opening or a plurality of openings, as described in further detail below. At least an opening 804 may include a through-opening; In an embodiment, a through-opening is open on two sides of temporary support frame 800, so that an object placed into the through-opening falls out of the temporary support frame 800 unless supported by additional objects or features, for instance as described in further detail below. In an embodiment, at least an opening 804 includes a blind opening, or an opening having a floor; additively manufactured body of material 200 may be placed upon floor, upon supports placed on floor or above floor and supported by other features of temporary support frame 800 or structures attached to the additively manufactured body of material 200 that then locate additively manufactured body of material 200 within the at least an opening 804, e.g. a rod or rods glued to the additively manufactured body of material 200 that then rest on the temporary support frame 800, supporting the additively manufactured body of material 200 within the at least an opening 804. A floor of a blind opening may be integral to temporary support frame 800, or may be one of a plurality of sections assembled to form the temporary support frame 800 as described in further detail below. At least an opening 804 may have any cross-sectional form, including a substantially rectangular form, any regular or irregular polygonal form, a substantially circular or elliptical form, any regular or irregular curved form, or any form combining polygonal and curved elements. The shape and size of at least an opening 804 may be standardized; a standard shape and size of opening may be recorded in a computing device controlling the manufacturing device 400, or may be used to assume a location of points within the at least an opening 804 for the purposes of generating machine control instructions. For example, where temporary support frame 800 has a frame reference feature as described below, the shape and size of the at least an opening 804 may be used to locate the at least an opening 804 within a coordinate system used in the machine control instructions when the temporary support frame 800 has been located using the frame reference feature.

In an embodiment, and continuing to view FIG. 8, at least an opening 804 is shaped to fit an additively manufactured body of material 200; for instance, at least an opening 804 may have one or more geometric characteristics of the additively manufactured body of material 200. As a non-limiting example, where additively manufactured body of material 200 has a peripheral form, at least an opening 804 may include an opening having a substantially similar peripheral form, albeit larger to admit the additively manufactured body of material 200. Continuing with the above example, the periphery of at least an opening 804 may be modified by frame reference features or frame locating features. At least an opening 804 may have any depth suitable for use with methods described in this disclosure.

Continuing to view FIG. 8, temporary support frame 800 may include at least a frame reference feature 808 designed, configured, and located for precisely locating the temporary support frame 800 relative to a manufacturing device 400. At least a frame reference feature 808 may include the size and shape or the outer periphery of temporary support frame 800; for instance, the outer periphery of temporary support frame 800 may have a predictable or standardized size and shape such that points in the frame are at predictable locations, relative to a coordinate system used to generate or implement machine control instructions, when temporary support frame 800 is secured in or against a feature of manufacturing device. In an embodiment, at least a frame reference feature 808 includes an attachment feature, such as one or more holes to admit bolts or studs, or one or more projections or recesses that fit a feature of manufacturing device; feature of manufacturing device 400 may include the surface of a base table, rotary table, a fixture, or the like.

In an embodiment, and still viewing FIG. 8, temporary support frame 800 is additively manufactured; for instance, the temporary support frame 800 may initially have a gap which is filled using additive manufacturing; likewise, a plurality of sections making up the temporary support frame 800 may be joined using additive manufacturing processes. Temporary support frame 800 may be additively manufactured using any process or combination of processes used to additively manufacture additively manufactured body of material 200 as described above. Any feature of temporary support frame 800 may be formed using additive manufacturing, including at least a frame reference feature 808 and at least an opening 804. In an embodiment, receiving temporary support frame 800 further includes subtractively manufacturing the temporary support frame 800. Temporary support frame 800 may be subtractively manufactured by removal of material from a blank by machining processes. Any feature of temporary support frame 800 may be formed using subtractive manufacturing including at least an opening. In an embodiment, temporary support frame 800 is manufactured using a combination of additive and subtractive manufacturing steps. In an embodiment, a prefabricated temporary support frame 800 is received, and one or more features are added using additive or subtractive manufacturing. Receiving temporary support frame 800 may also be accomplished by receiving a prefabricated frame, or by reusing a frame that has been used in a previous manufacturing method, including without limitation any method described in this disclosure. In an embodiment, temporary support frame 800 may be integral to additively manufactured body of material 200, e.g. additively manufactured at the same time as the body of material containing the final discrete object and connected to the additively manufactured body of material 200 so that there is an additively manufactured body of material 200 containing both the frame and pre-subtractively manufactured plurality of discrete objects amongst other geometry.

With continued reference to FIG. 8, in an embodiment, method 100 further includes assembling temporary support frame 800 from a plurality of sections. As a non-limiting example, there may be two or more sections of temporary support frame 800 that, when assembled, define at least an opening 804; for instance, at least an opening 804 may have an interior surface, a first fractional portion of which is a surface of a first section, and a second fractional portion of which is a surface of a second section, the first section and second section able to be joined to form the complete interior surface. A plurality of sections may include a base section that, when added to frame, converts at least an opening 804 from a through-opening to a blind opening. In an embodiment, a plurality of sections includes two or more lateral sections that define a periphery of at least an opening 804; in an embodiment, a portion of temporary support frame 800 defining the periphery of at least an opening is fused or monolithic, and assembling the temporary support frame 800 includes adding the base element. An assembled temporary support frame 800 may be fastened together, taped together, or clamped or vised together, for instance using feature of the manufacturing device used to secure the stabilized workpiece. In an embodiment, the one or more sections may be assembled in a manner that adjusts the size or shape of the at least an opening; as a non-limiting example, temporary support frame 800 may include a container with an open top, such as a five-sided rectangular box, and one or more elongate members such as rods, that rest on the top. Sliding one or more rods in different directions may divide the open top into differently sized and/or shaped openings. As a non-limiting example, one or more elongate members may be four elongate members that are free to slide along open top, creating vertices of a quadrilateral form at their intersections; the quadrilateral form may be a parallelogram, rectangle, trapezoid, square, or the like. As a non-limiting example continued from above, sides may be made of a self-sealing material or material that can be sealed and elongate members may protrude through the sides at one or multiple different heights. A user may slide elongate members to choose a desired shape and size for quadrilateral form to match the quadrilateral form to the size and shape of the additively manufactured body of material 200. In an embodiment, container has an open bottom as well; for instance, the container may be a sidewall like the sidewall of a box, forming a loop of sidewall the top of which is the open top. Sidewall may be formed by joining one end of a strip of material to another end.

Continuing to view FIG. 8, temporary support frame 800 may include at least a locating frame feature 812. At least a locating frame feature 812 may be constructed and used in any manner for the construction or use of at least a locating feature 416 of manufacturing device 400; temporary support frame 800 may function as a support 408 as described above. In some embodiments, at least a locating frame feature 812 is placed at regular intervals around temporary support frame 800; for instance, the at least a locating frame feature 812 may be placed at corners and at some side midpoints of the temporary support frame 800.

Still viewing FIG. 8, additively manufactured body of material 200 may be placed in the at least an opening 804. Where additively manufactured body of material 200 is placed in a blind opening, the additively manufactured body of material 200 may be set on a floor of the blind opening; where the additively manufactured body of material 200 is placed in a through opening, additively manufactured body of material 200 may rest on a surface on which temporary support frame 800 rests. In an embodiment, placing further includes locating additively manufactured body of material 200 in a precise position relative to temporary support frame 800. Locating additively manufactured body of material 200 may be performed using physical measurements from a precisely located feature of temporary support frame 800; for instance, where temporary support frame 800 includes at least a frame reference feature 808 as described above, additively manufactured body of material 200 may be located in at least an opening by measuring from at least a frame reference feature 808 to a feature of additively manufactured body of material 200, which may be at least a reference feature 212. As a non-limiting example, where at least an opening 804 includes a substantially rectangular opening having a standard form and body of material is a substantially regular shape having a standard form, sides of additively manufactured body of material 200 may be placed particular distances from sides of the substantially rectangular opening. Physical placement may be guided by any suitable measurement technique, including without limitation graduated rulers, calipers, scanning devices, or linear displacement sensors. Similarly, where temporary support frame 800 and additively manufactured body of material 200 are placed on a tray as set forth in further detail below, tray may have indicia or surface features that guide the precise placement of the temporary support frame 800 and additively manufactured body of material 200, which may include support features as described in further detail below. Where receiving additively manufactured body of material 200 includes additively manufacturing additively manufactured body of material 200, additively manufactured body of material 200 may be manufactured in a precise location within at least an opening 804; temporary support frame 800 and additively manufactured body may be additively manufactured together using the same coordinate system, for instance where the temporary support frame 800 is part of the additively manufactured body of material 200, or where a part of the temporary support frame 800 is a part of the additively manufactured body of material 200. Alternatively, temporary support frame 800 may be located, using one or more reference features of the temporary support frame 800, within a coordinate system used to manufacture additively manufactured body of material 200, with the result that the additively manufactured body of material 200 is at a precise location within at least an opening 804. In an embodiment, machine control instructions used to manufacture discrete object may be generated using known location of precisely located additively manufactured body of material 200, for instance by locating additively manufactured body of material 200 within frame, and locating temporary support frame 800 within secondary manufacturing device coordinate system using at least a reference feature 212. Locating may also be performed by connecting reference features to at least a locating frame feature 812, for example as described in further detail below.

In an embodiment, additively manufactured body of material 200 is not located precisely within at least an opening 804. Manufacturing device may be set up to have an origin of a coordinate system at a particular feature of additively manufactured body of material 200; setup may be performed by a user or robot, for instance by advancing a mill of manufacturing device and moving mill relative to additively manufactured body of material 200 until mill contacts a chosen feature of additively manufactured body of material 200 to establish an origin point. Further measurements or calibration may be used to orient additively manufactured body of material 200 relative to coordinate axes. In addition a 2D or 3D scanner could be used to precisely locate additively manufactured body of material 200 in relation to the frame. As non-limiting example, a scanner may be attached to the manufacturing device which digitally scans frame and additively manufactured body of material 200 and uses the resulting point cloud to generate a unified additively manufactured body of material 200 from which machine instructions may be generated or to which previously generated machine instructions may be mapped. Persons skilled in the art will be aware of many techniques for precisely locating a workpiece within a manufacturing device, for instance to permit the manufacturing device to follow automated toolpaths in performing manufacturing steps on the workpiece.

Continuing to view FIG. 8, additively manufactured body of material 200 may include at least a portion of temporary support frame 800. For instance, in an embodiment, entire temporary support frame 800 is included in additively manufactured body of material 200. In an embodiment, only part of temporary support frame 800 is included; for instance, where the temporary support frame 800 is rectangular, one side of the temporary support frame 800 may be included in additively manufactured body of material 200, while three remaining sides are not. At least a portion of temporary support frame 800 may fill a gap in the remainder of frame as provided. At least a portion of temporary support frame 800 may fit into a slot or recess in temporary support frame 800. At least a portion of temporary support frame 800 may fit over a projection of the rest of the temporary support frame 800. At least a portion of temporary support frame 800 may be manufactured in the same additive manufacturing process as additively manufactured body of material 200. In some embodiments, at least a portion of temporary support frame 800 is a reference feature as disclosed above; at least a portion may be used to locate the additively manufactured body of material 200 at or within the temporary support frame 800 or within manufacturing device 400.

Still viewing FIG. 8, temporary support frame 800 may be otherwise connected to additively manufactured body of material 200 using at least a support leg 220. At least a support leg 220 may extend from additively manufactured body of material 200 to at least a locating frame feature 812. At least a support leg 220 may include at least a support leg 220 extending to each locating frame feature 812 when additively manufactured body of material 200 is located within at least an opening 804. Two or more support legs of at least a support leg 220 may extend to a locating frame feature 812 of at least a locating frame feature 812. In some embodiments, two or more legs extend from two different locations on additively manufactured body of material 200 to two a single locating frame feature 812, for instance from two different precursors of plurality of precursors of plurality of discrete objects; this may create one or more triangular structures made up of support legs. One or more cross-braces 816 may connect two or more support legs; the one or more cross-braces may increase the stability of additively manufactured body of material 200.

Figure 9A:
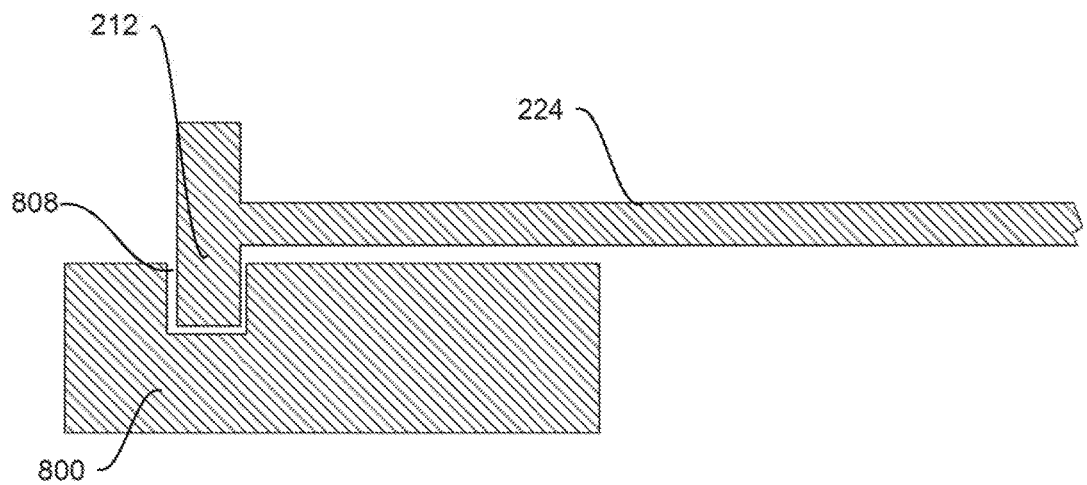
FIG. 9A is a partial cross-sectional view of temporary support frame with a support leg and reference feature in accordance with an embodiment.
Figure 9B:
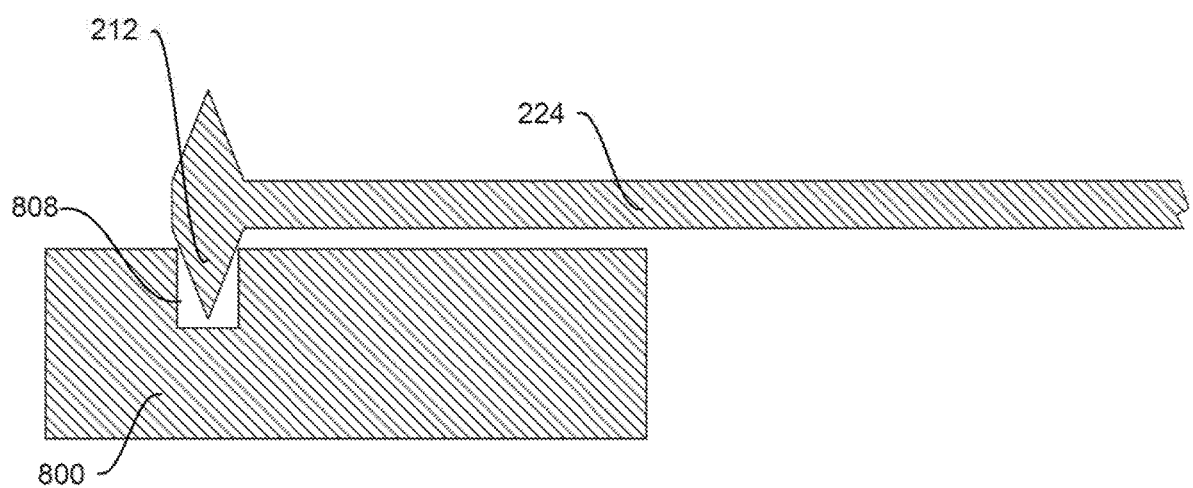
FIG. 9B is a partial cross-sectional view of temporary support frame with a support leg and reference feature in accordance with an embodiment.

At least a reference feature 212 may include one or more reference features that mate with at least a locating frame feature 812; in other words, at least a reference feature 212 may be used to locate additively manufactured body of material 200 at manufacturing device 400 by locating additively manufactured body of material 200 at temporary support frame 800, either before or after temporary support frame 800 is located at manufacturing device 400. In some embodiments, at least a reference feature 212 is additively manufactured as a function of at least a locating frame feature 812; this may be accomplished using any process for manufacturing at least a reference feature 212 as a function of locating feature 416 as described above. As a non-limiting example, additively manufactured body of material 200 may have at least a support leg 220 and at least a reference feature 212 additively manufactured to be located by mating to or locating at or in one or more locating frame features 812, as illustrated for example in FIGS. 9A-B. As shown in FIGS. 9A-B, at least a reference feature 212 may have a rectangular or cylindrical profile, or a triangular or pyramidal profile, to fit within a locating frame feature of the at least a locating frame feature 812; this is illustrated for exemplary purposes only, and persons skilled in the art, upon reading the entirety of this disclosure, will be aware of many alternative ways that at least a reference feature 212 may be additively manufactured as a function of at least a locating frame feature 812 or mated with at least a locating frame feature 812.

Still referring to FIGS. 9A-B, at least a reference feature 212 may be used with temporary support frame 800 in any way described above. For example, and without limitation, at least a reference feature 212 used with temporary support frame 800 may include at least a reference feature 212 may include at least a first-side reference feature 708 on first side 700 and at least a second-side reference feature 712 on second side 704, as described above in reference to FIGS. 7A-B. In an embodiment, additively manufactured body of material 200 may be engaged with temporary support frame 800 using at least a first-side reference feature 708 for a first set of machining steps of step 125, and then flipped over or otherwise moved into a different orientation relative to temporary support frame 800 using at least a second-side reference feature 708. This may be performed either within manufacturing device 400 or outside manufacturing device 400. In each position, additively manufactured body of material 200 may be clamped or otherwise secured to temporary support frame 800 in each position.

Referring again to FIG. 1, at step 120, the additively manufactured body of material 200 is located within a manufacturing device using the at least a reference feature 212. As used herein, location of additively manufactured body of material 200 "within" manufacturing device 400 is intended to encompass location of additively manufactured body of material 200 "at," "in," or "on" manufacturing device 400; for instance, where the manufacturing device 400 does not have an interior within which additively manufactured body of material 200 may be located, the additively manufactured body of material 200 may be located on or at manufacturing device 400, for instance by securing the additively manufactured body of material 200 to a support 408 or engaging the additively manufactured body of material 200 to a locating feature 416. Locating may include locating additively manufactured body of material 200 at a support 408, which may be a fixture, a temporary support frame, or any other example described above as a possible form for a support 408. Support 408 may not be located within manufacturing device 400 when additively manufactured body of material 200 is mounted to the support 408. In some embodiments, locating includes mounting additively manufactured body of material 200 to support 408 and then locating the support 408 within manufacturing device 400. As a non-limiting example, where support 408 is a fixture, additively manufactured body of material 200 may be secured to fixture prior to securing fixture within manufacturing device 400. Where support 408 is a temporary support frame 800, additively manufactured body of material 200 may be secured to the temporary support frame 800 prior to securing fixture within manufacturing device 400. Additively manufactured body may be mounted at support 408 using at least a reference feature 212; mounting to support 408 may include locating additively manufactured body of material 200 at support with precision, after which the support 408 may be located within manufacturing device 400 with precision, so that the additively manufactured body of material 200 is located at the manufacturing device 400 precisely.

Still referring to FIG. 1, location of additively manufactured body of material 200 within manufacturing device 400 is accomplished using at least a reference feature 212. At least a reference feature 212 may be fitted to or mated with one or more locating features 416 at manufacturing device 400. For example, where one or more locating features 416 includes at least a recess and at least a reference feature 212 includes at least a projection, at least a projection may be inserted into at least a recess. As another example, where one or more locating features 416 includes at least a projection and at least a reference feature 212 includes at least a recess, at least a recess may be inserted onto at least a projection. Where at least a reference feature 212 is formed to be located using a fixture, clamp, vise, or other element of manufacturing device 400, location may involve insertion into or mating with fixture, clamp, vise, or other element of manufacturing device 400. Location may include location with precision, such as location at precise point and orientation with respect to a coordinate system used by manufacturing device 400 or machine control instructions directing manufacturing device 400

Figure 10:
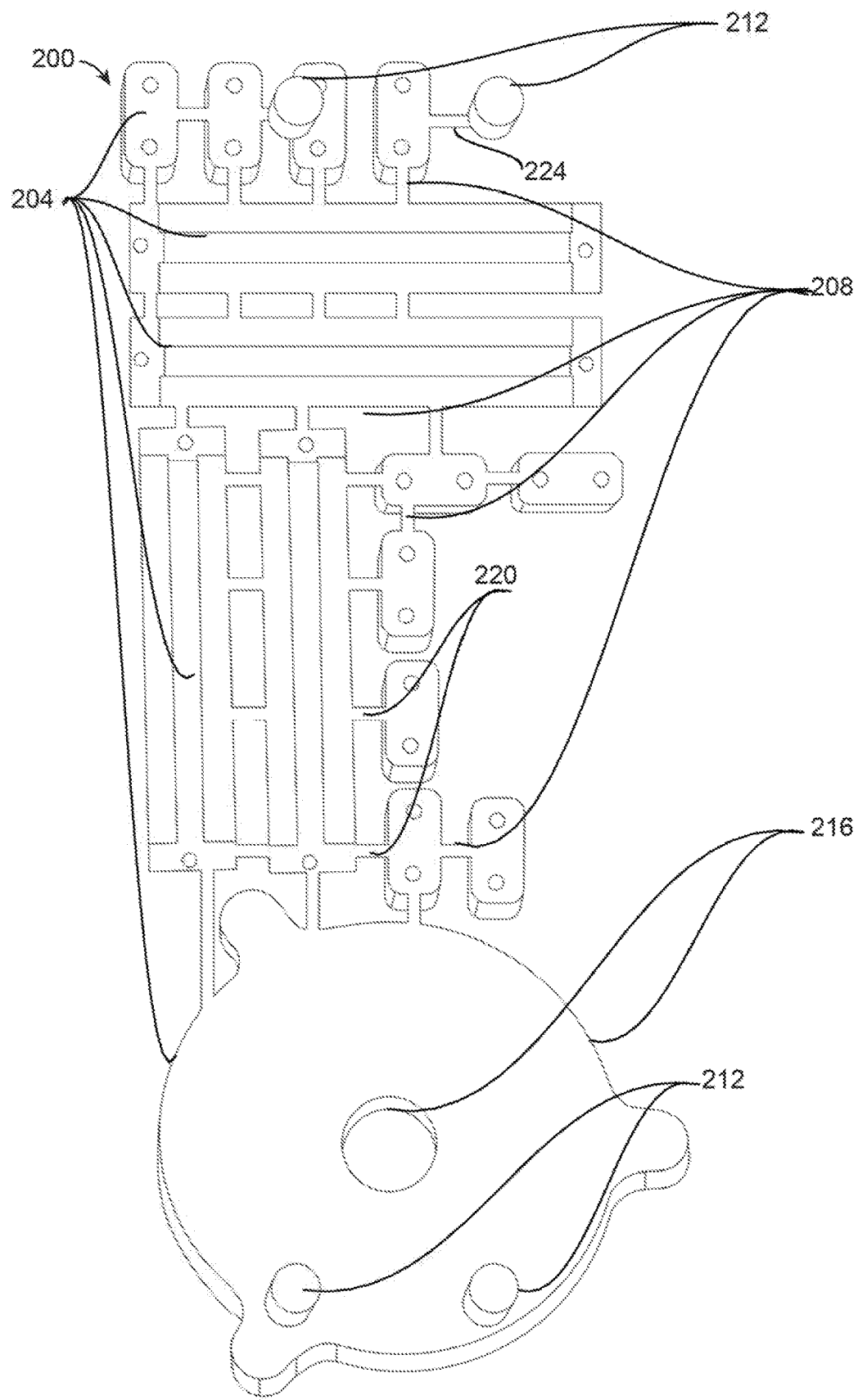
FIG. 10 is a perspective view of an exemplary additively manufactured body of material in accordance with an embodiment.

In some embodiments, additively manufactured body of material 200 is located within manufacturing device 400 using reference features on an opposite side of additively manufactured body of material 200 from the side currently subjected to machining. As a non-limiting example provided solely for the purposes of illustration, at least a reference feature 212 shown on additively manufactured body of material 200 as illustrated in FIG. 2 may not be used to located additively manufactured body of material 200 for the purposes of machining the side of additively manufactured body of material 200 that is visible in FIG. 2; as non-limiting illustration, FIG. 10 shows an exemplary embodiment of the additively manufactured body of material 200 illustrated for exemplary purposes in FIG. 2, as seen from the other side, and showing additional reference features of at least a reference feature 212 that may, in an embodiment, be used to locate the additively manufactured body of material 200 so as to machine the side shown in FIG. 2.

Referring again to FIG. 1, in an embodiment, location may not be precise location. Manufacturing device 400 may be set up to have an origin of a coordinate system at a particular feature of additively manufactured body of material 200; setup may be performed by a user or robot, for instance by advancing a mill of manufacturing device 400 and moving mill relative to additively manufactured body of material 200 until mill contacts a chosen feature of additively manufactured body of material 200 to establish an origin point. Further measurements or calibration may be used to orient additively manufactured body of material 200 relative to coordinate axes. In addition a 2D or 3D scanner may be used to precisely locate additively manufactured body of material 200 300 in relation to manufacturing device 400 As non-limiting example, a scanner may be attached to the manufacturing device 400 which digitally additively manufactured body of material 200 and uses the resulting point cloud to generate an additively manufactured body of material 200 from which machine instructions may be generated or to which previously generated machine instructions may be mapped. Persons skilled in the art will be aware of many techniques for precisely locating a workpiece within a manufacturing device, for instance to permit the manufacturing device to follow automated toolpaths in performing manufacturing steps on the workpiece.

At step 125, and still referring to FIG. 1, plurality of discrete objects is formed from the additively manufactured body of material 200 by subtractive manufacturing. Step 125 may be performed using a manufacturing device. Manufacturing device may be operated manually or automatically or a combination of both. In an embodiment, manufacturing device is programed by one or more machine control instructions; the one or more machine control instructions may be executed using a microcontroller or other computing device imbedded in or attached to manufacturing device. Manufacturing device may include one or more cutting tools or abrading tools, including but not limited to mills. Forming discrete object may be performed by removing material according to any method described above for subtractive manufacturing. As a non-limiting example, subtractive manufacturing may include milling. Subtractive manufacturing may include the use of EDM, lasers, plasma cutters, water jets, and lathes. Subtractive manufacturing may include a flexible manufacturing system where stabilized workpieces are mounted on tombstones and the tombstones are loaded into a subtractive manufacturing machine for subtractive manufacturing. Loading and unloading of stabilized workpieces may or may not occur at a location of subtractive manufacturing machine and in a flexible manufacturing system may be shunted to the next available appropriate subtractive manufacturing machine.

Still referring to FIG. 1, step 125 may include performing multiple positionings of additively manufactured body of material 200 at one or more secondary manufacturing devices; multiple positionings may be performed by using reference features of frame or additively manufactured body of material 200 to located additively manufactured body of material 200 in a plurality of different positions within a coordinate system used by a secondary manufacturing device. In an embodiment, subtractive manufacturing may create new features within the additively manufactured body of material 200 which may be used as reference features for repositioning. Multiple positionings may be performed with multiple machine setup by using reference features of frame or additively manufactured body of material 200 to located additively manufactured body of material 200 in a plurality of different positions within a coordinate system used by a secondary manufacturing device. For instance, additively manufactured body of material 200 may be positioned with a first side up for some machining steps, then flipped with that side down for subsequent steps; additively manufactured body of material 200 may also be turned about a vertical axis and repositioned using reference features. Multiple positionings may be arranged by performing multiple machine setups; i.e., an origin or other reference point of secondary manufacturing device may be placed at a first location on additively manufactured body of material 200 for a first set of secondary manufacturing steps and at a second location on additively manufactured body of material 200 for a second set of manufacturing steps, and at further locations as desired for additional steps. Alternatively, multiple positionings may occur on multiple subtractive manufacturing machines.

Continuing to refer to FIG. 1, in an embodiment, one or more interconnecting portions of additively manufactured body of material 200 may be removed by subtractive manufacturing. Removing these interconnecting portions results in the objects, and temporary support frame 800 if present, becoming discrete structures; discrete structures may be held together by only removable fixating material, where removable fixating material is used as described below. An efficient example is present when one side (reverse side) of additively manufactured body of material 200 must be processed to remove a uniform thickness across that entire side in the region of discrete objects. Such a situation might occur, for example, when one or more faces of discrete objects are located at a minimum depth from the raw face of additively manufactured body of material 200 on that side. In this case, the thickness of interconnecting may be made to be equal to or less than that minimum depth. Then, continuing the example, to remove interconnecting portions and perhaps also at least partially finish each of discrete objects, one subtractive manufacturing operation may be to remove a uniformly thick region of material from entire reverse side of stabilized workpiece that removes the interconnecting portions and material from each of precursors to discrete objects as a step toward finishing each of the discrete objects.

In a further optional step (not shown), and continuing to refer to FIG. 1, at least a discrete object of plurality of discrete objects formed at step 135 may be further processed as desired to finish the at least a discrete object. Examples of further process include but are not limited to: secondary machining, polishing, painting, powder coating, plating, silk-screening, and any combination thereof, among others. Fundamentally, there is no limitation on the finishing steps, if any, that may occur at the optional step.

In the foregoing method, the transitions between steps and/or locations at which the steps are performed may vary from one instantiation to another. For example, in an instantiation in which there is a milling machine, such as a CNC milling machine having a movable horizontal x-y bed and a rotational milling tool that moved in the z (vertical) direction, once a CAM model of additively manufactured body of material 200, if any, has been provided to the milling machine and additively manufactured body of material 200 is properly located for machining by the CNC milling machine, the machine may be controlled to perform step 125 of method 100 so as to subtractively manufacture one or more features or shapes on a first side of the additively manufactured body of material 200 while leaving the additively manufactured body of material 200 together. Once CNC milling machine has completed machining on one side of additively manufactured body of material 200 one or more workers, robot, or another machine may move the partially milled additively manufactured body of material 200 to a different position at the machine, to permit machining of a second side of additively manufactured body of material 200. In an embodiment, one or more workers or robotic devices may add removable fixating material prior to the machining of second side of additively manufactured body of material 200; this may be performed at a separate location within the manufacturing location, or even a geographically separate location, or alternatively, at the machine; for example, in some instantiations, the additively manufactured body of material 200 and frame may be placed on the horizontal x-y bed of the CNC milling machine, where a worker, robotic arm, etc., could install the removable fixating material at step.

By removing interconnecting portions where present, discrete objects may become discrete structures held together only by removable fixating material, where present. It is noted that uniform-thickness material removal from the reverse side of additively manufactured body of material 200 is only an example. Interconnecting portions can be removed in any suitable or desired manner. For example, interconnecting portions may be removed from the reverse side without removing any material of structures located over any of discrete objects. As another example, if some but not all of discrete objects require material removal from the reverse side, that material may be removed along with removal of interconnecting portions. Fundamentally, there is no limitation on the manner in which subtractive manufacturing is used to remove bridging to form discrete objects. For instance, interconnecting portions may be removed from a top side of additively manufactured body of material 200, from a bottom side of the additively manufactured body of material 200, or both; considerations including geometry considerations and/or considerations concerning the design of manufacturing device may determine how the interconnecting structures are removed. In an embodiment, removable fixating material maintains stability of additively manufactured body of material 200 during and after removable of interconnecting portions; thus, for instance, additively manufactured body of material 200 may remain stable after interconnecting portions are removed, so that further subtractive manufacturing may be performed on additively manufactured body of material 200.

If CNC milling machine can perform machining from only one side, then additively manufactured body of material 200 may be in a flipped orientation relative to its orientation during the first or subsequent milling operations of step 125. If CNC milling machine is capable of milling from multiple sides of a body of material, then additively manufactured body of material 200 may not need to be moved at all prior to the completion of step 125.

Some or all of the steps of method 100 and/or intermediate handling steps between the steps of method 100 may be automated to reduce the need for human interaction and contribution and associated costs. Such automation may be implemented using a work cell approach, wherein multiple steps are performed by one or more multitask or a set of single-task work-cell machines and one or more manipulators, as needed, to move a body of material among the work-cell machines. Alternatively, the automation may be implemented using an assembly-line approach, wherein two or more single and/or multitask machines form an assembly line with suitable automated and/or manual conveyance means (e.g., conveyor belts, robots, dollies, push carts, etc.) for moving each body of material from one machine to the next. Additionally, method 100 is exemplary and a person of ordinary skill in the art will, after reading this disclosure in its entirety will readily appreciate that method 100 may occur in a different order than show here.

Figure 11:
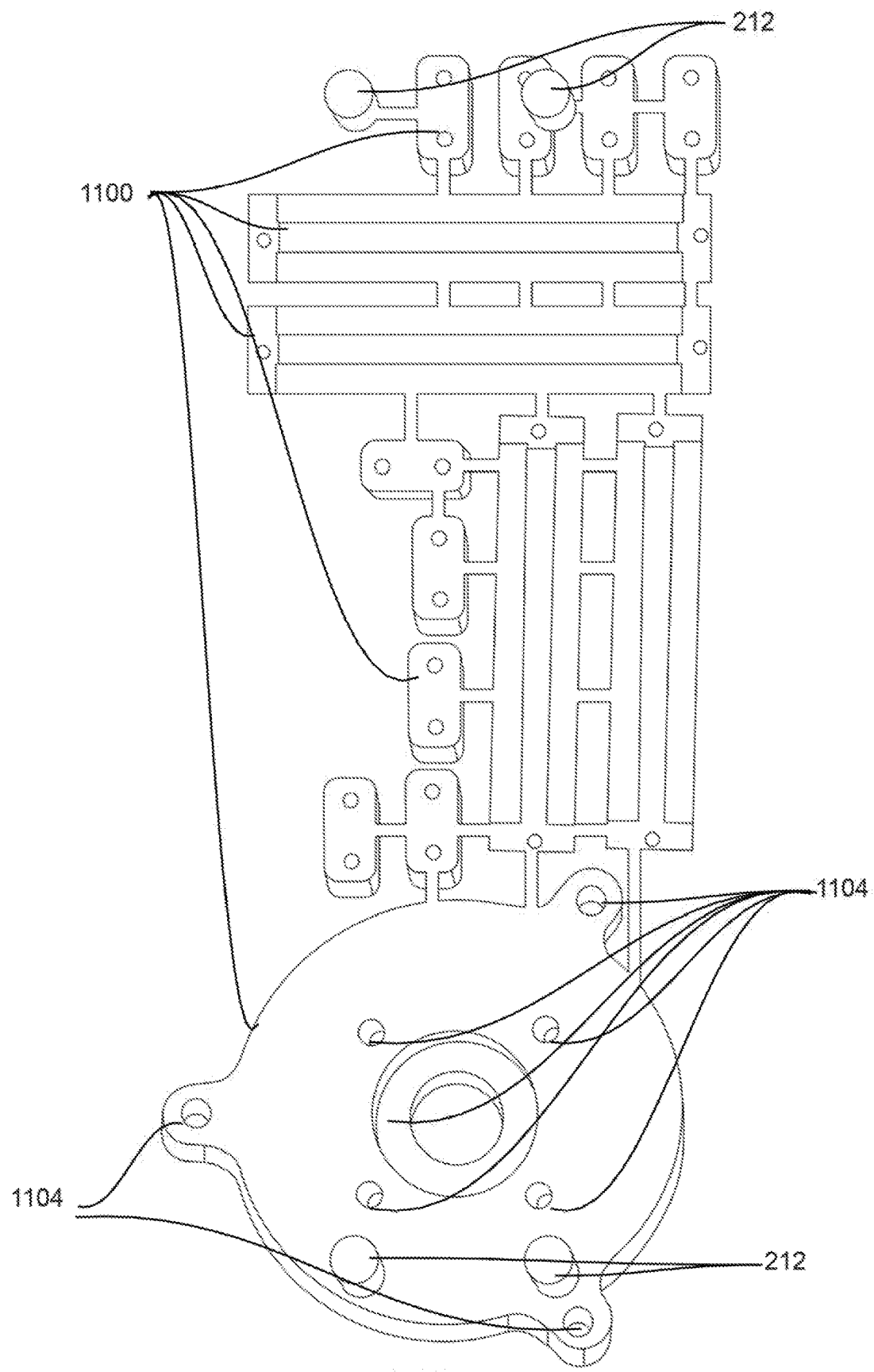
FIG. 11 is a perspective view of an exemplary plurality of discrete objects in accordance with an embodiment.

Referring now to FIG. 11, an exemplary embodiment of a plurality of discrete objects 1100 produced at step 125 is illustrated. In an embodiment not shown, at least an extension 208 may be removed by subtractive manufacturing; in an embodiment, at least an extension 208 may be left in place during subtractive manufacturing. At least an extension 208 may be removed afterward using another process, such as cutting with manual cutters, a band saw, or another cutting implement. As noted above, each of plurality of discrete objects 1100 may have features 1104 formed by subtractive manufacturing that were absent from additively manufactured body of material 200, such as one or more holes, which may be through-holes or blind holes or holes that have been formed that subsequently were tapped to produce threads. Discrete objects 1100 may have modified features that were present in additively manufactured body of material 200; for instance, surfaces of discrete objects may have been subtractively manufactured flat or machined to allow a tolerance fit, for instance a press-fit for a bearing.

Figure 12:
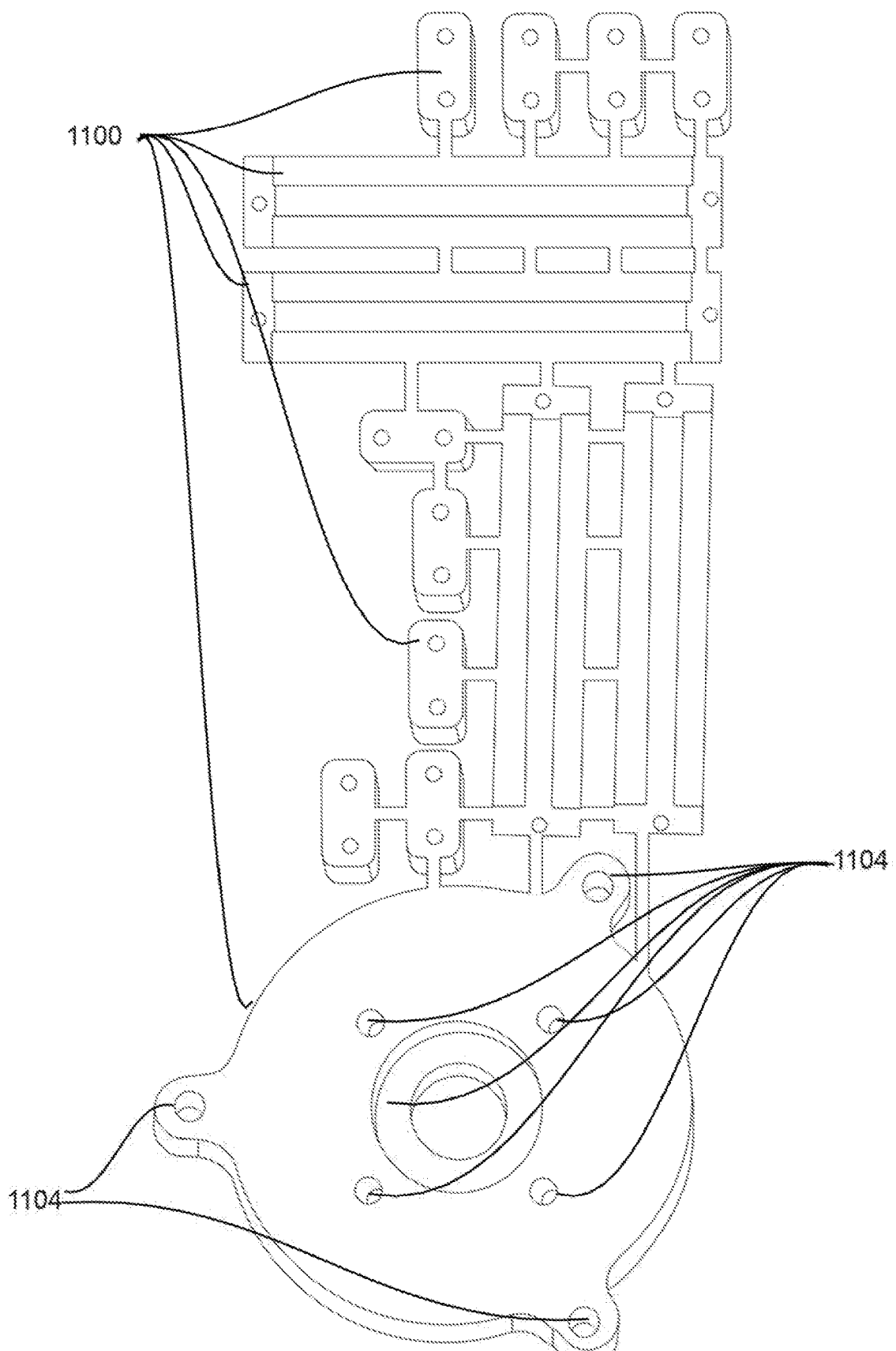
FIG. 12 is a perspective view of an exemplary plurality of discrete objects in accordance with an embodiment.

As illustrated for example in FIG. 12, at least one of at least a reference feature 212 may be removed. For example, at an optional step not illustrated, at least a reference feature 212 may be removed by subtractive manufacturing, which include any process or combination of processes described above for subtractive manufacturing. At least a reference feature 212 may be removed by other means, such as sawing, clipping, cutting, or removal by further manufacturing devices.

In an embodiment, where there is a temporary support frame 800 at least a portion of which is a part of additively manufactured body of material 200, step 125 may include removing a portion of the temporary support frame 800 using subtractive manufacturing. For instance, where temporary support frame 800 includes an integrally attached base portion that makes at least an opening a blind opening, the integrally attached bottom may be removed by subtractive manufacturing so that the side of the additively manufactured body of material 200 covered by the base portion may be accessed for subtractive manufacturing. Lateral portions of temporary support frame 800 may be partially or wholly removed to permit access to a side of the additively manufactured body of material 200. In an embodiment, where additively manufactured body of material 200 is placed on a trunnion table, manufacturing device 400 may remove material from more than one side of additively manufactured body of material 200 in one setup; in that situation, additively manufactured body of material 200 may be mounted to trunnion table with all or part of frame removed, allowing machining from multiple directions. For instance, a base portion of frame may remain attached to additively manufactured body of material 200, and fixed to trunnion table or rotary table.

Still referring to FIG. 11, at 130, the plurality of discrete objects 1100 is removed from the manufacturing device 400. This may be accomplished manually, or by automated processes as described above, including use of robots or other automated machinery to move plurality of discrete objects 1100 from one location to another. Plurality of discrete objects 1100 may be subjected to further processing steps as described above; furthermore, at least an extension 208, at least a reference feature 212, or both may be removed from plurality of discrete objects 1100 subsequent to removal from within manufacturing device 40. Where removable fixating material is used, removable fixating material may be removed, for instance by melting or dissolving the removable fixating material.

Although in the foregoing illustrative description the manufacturing process performed on additively manufactured body of material 200 is a subtractive manufacturing process, in an embodiment some non-subtractive manufacturing steps are also performed on additively manufactured body of material 200; such steps may include without limitation any additive manufacturing step described above. In an embodiment, additive and subtractive manufacturing steps are each performed on additively manufactured body of material 200.

Similarly, some steps used to produce additively manufactured body of material 200, including without limitation at least a precursor 204 to plurality of discrete objects, at least an extension 208, and/or at least a reference feature 212, may include subtractive processes as well as additive processes. For instance, additively manufactured body of material 200 at least a reference feature 212 receiving an additively manufactured body of material 200 may include receiving an additively manufactured body of material 200 including a precursor to a discrete object and at least a precursor 204 to at least a reference feature 212 (not shown). Continuing the example, at least a precursor 204 to at least a reference feature 212 may have any form suitable for a precursor to a discrete object as described above; at least a precursor 204 to at least a reference feature 212 may include a "near net" version of one or more of at least a reference feature 212. Alternatively, and still continuing the example, at least a precursor 204 to at least a reference feature 212 may include a block of material of any suitable shape from which reference features may be manufactured; at least a precursor 204 to at least a reference feature 212 may be composed of any material or combination of materials suitable for the composition of at least a precursor 204 to a discrete object. Further continuing the example, at least a precursor 204 to at least a reference feature 212 may be manufactured according to any manufacturing methods suitable for the manufacture of at least a precursor 204 to a discrete object; at least a precursor 204 to at least a reference feature 212 may be manufactured together with at least a precursor 204 to a discrete object.

Continuing the example, at least a reference feature 212 may be formed, by subtractive manufacturing, from at least a precursor 204 to at least a reference feature 212; forming by subtractive manufacturing may be implemented using any subtractive manufacturing process described above. Further continuing the example, additively manufactured body of material 200 additively manufactured body of material 200 at least a reference feature 212 may be manufactured as a function of a locating feature 416 at or within manufacturing device 400; at least a reference feature 212 may be subtractively manufactured to fit to locating feature 416 by receiving subtractive manufacturing control commands directing the subtractive manufacture of the at least a reference feature 212. Further continuing the example, subtractive manufacturing control commands may be generated using a computer model or graphical representation of a locating feature 416, or of at least a reference feature 212, at manufacturing device 400; subtractive manufacturing may be performed as a function of computer model of the locating feature 416 and/or at least a reference feature 212.

Turning now to FIG. 13, an exemplary method 1300 of manufacturing a discrete object from an additively manufactured body of material 200, the additively manufactured body of material 200 including at least a precursor to a plurality of discrete objects, at least an extension, and at least a reference feature, is illustrated. At step 1305, a graphical representation of at least a precursor to the plurality of discrete objects to be machined from the additively manufactured body of material 200 is received. At step 1310, a graphical representation of the at least an extension is received. At step 1315, a graphical representation of the at least a reference feature is received. At step 1320, a graphical representation of a first plane and a graphical representation of a second plane is received, where machining the plurality of discrete objects from the additively manufactured body of material 200 includes removal of material from at least one of the first plane and the second plane. At step 1325, the computer model of the additively manufactured body of material 200 is generated; the computer model of the additively manufactured body of material 200 includes the graphical representation of the first plane, the graphical representation of the second plane, the graphical representation of the at least a precursor to the plurality of discrete objects to be machined from the additively manufactured body of material 200, the graphical representation of at least an extension, and the graphical representation of the at least a reference feature.

In an embodiment, and still viewing FIG. 1, modeling may include detection of one or more geometric features of objects to be formed from body of material or of one or more precursor elements in body of material. Detection of one or more geometric features may include detection one or more features to form from body of material, for instance. This may be accomplished, as a non-limiting example, by receiving one or more user instructions indicating one or more features to form. Alternatively or additionally, automated manufacturing system 200 and/or computing device 240 may detect at one or more features to form 316 by interrogating discrete object computer model 302. Interrogation, as used herein, is a process whereby a system incorporating at least a computing device, including without limitation automated manufacturing system 200 and/or computing device 240, analyzes a graphical model of a body, discrete object, part, product, workpiece, or the like, and extracts information describing one or more features represented in the graphical model, either as existing features of the body discrete object, part, product, workpiece or the like, or as features to be added to and/or formed thereon. Information extracted during interrogation may include, without limitation, geometrical information, such as lengths, widths, heights, thicknesses, contours, bend radii, opening sizes and locations, volumes, etc.; part clearances; dimensional tolerances; materials; finishes; purchased components, such as mechanical fasteners, hinges, handles, latches, etc.; and certifications. Persons skilled in the art, upon reviewing the entirety of this disclosure, will be aware of various categories of data that may likewise be extracted during interrogation. In some embodiments, model-based pricing information may be considered to be parsed into "raw" variables and "processed" variables. Raw variable are variables that an interrogator can obtain directly from the computer-model data, and processed variables are variables generated by the interrogator from raw variables. Processed variables may be thought of as inputs needed for generating a price but that are not directly available from the computer-model data. In the context of an example for machining fabrication based on a SolidWorks® computer model, raw variables may include face count, surface count, hole count, and counterbore count, and processed variables may include cutout volume and machining operation setup count.

Interrogation may involve parsing and/or analyzing a graphical model such as a three-dimensional computer model including without limitation a CAD model to identify separate elements thereof by reading specific commands issued by or to a modeling program used to create and/or modify the graphical model. Interrogation may involve parsing and/or analyzing a graphical model to identify specific routines or functions associated with such commands to determine whether they collectively define an individual element or portion (a "shape," "solid body," or "component") of a 3D computer model. Many CAD systems, including, by way of example, SolidWorks® (registered trademark of Dassault Systemes), include an application program interface (API) to enable a user to control the issuance of customized routines or functions associated with such commands. Interrogation may involve reading such commands, routines, and functions to determine whether they define an individual shape, and, if so, may analyze various geometric aspects of the defined shape to determine whether such aspects correspond to one or more manufacturing requirements for a product to be manufactured based on a 3D computer model.

As a non-limiting example of interrogation using or based on the SolidWorks CAD program, interrogation may involve reading the "FeatureManager Design Tree" (an outline representation of individual shapes) to determine the number of solid bodies (or shapes) in the design. Representations of individual shapes may be found in other CAD software files, and other CAD software systems may be used. In SolidWorks, one command usable to analyze the number of solid bodies is:

```
object[ ]bodies=(object[ ])part.GetBodies2((int)
    Const.swBodyType_e.swSolidBody,false);
``` and the output is a list of bodies. The foregoing code statement is listed by way of example only; other code statements or sequences may be used. Interrogation may involve analyzing geometric aspects of such identified shapes and comparing such aspects to corresponding manufacturing requirements. In an embodiment, these manufacturing requirements may include given starting materials. In general, interrogation may be performed using any method, facility, or combination thereof used for identifying features of a graphical model of an object, including without limitation methods or facilities used by CAD or CAM systems, for instance for toolpath generation.

In an embodiment, automated manufacturing system 200 and/or computing device 240 may identify at least a feature to be formed 316 by comparing a model of discrete object incorporating such features and/or a model of a part or product to be formed from discrete object to a model of discrete object in which such features are excluded. Interrogation may further provide a modification history of discrete object computer model 302 indicating one or more features recently added by a user or automated process.

Automated manufacturing system 200 and/or computing device 240 may select first side 116 based on detected features; for instance, interrogation may produce data indicating that one or more features to form 316 may be formed by inserting a given side of discrete object in a recess and rotating a resulting unified workpiece to render a location of each feature accessible to a machine tool, for instance on a rotary table or the like; the given side may therefore be selected as first side 116. This process may be iterative; for instance, automated manufacturing system 200 and/or computer device 240 may identify an initial first side 116, perform the remaining steps of any method disclosed herein for generation and/or manufacture of a support structure, such as support structure 100, corresponding to the initial first side, then identify a second first side 116 and repeat any and all such steps to form an additional support structure. In this way, where at least a feature to form 316 may not be formed using a single unified workpiece 136 as described above, automated manufacturing system 200 and/or computing device 240 may generate models of and/or manufacture a plurality of support structures to enable manufacture of each feature of at least a feature to form 316. First side 116 may alternatively or additionally be specified by user input.

Persons skilled in the art, upon review of the entirety of this disclosure, will be aware of various techniques, APIs, facilities, and/or algorithms for automated determination of orientations for manufacture of a given feature on a given discrete object and/or determination of feasibility of formation of a given feature from a given orientation, for instance using toolpath generation programs, machine-control instruction generation programs, "slicers," and the like.

Figure 14:
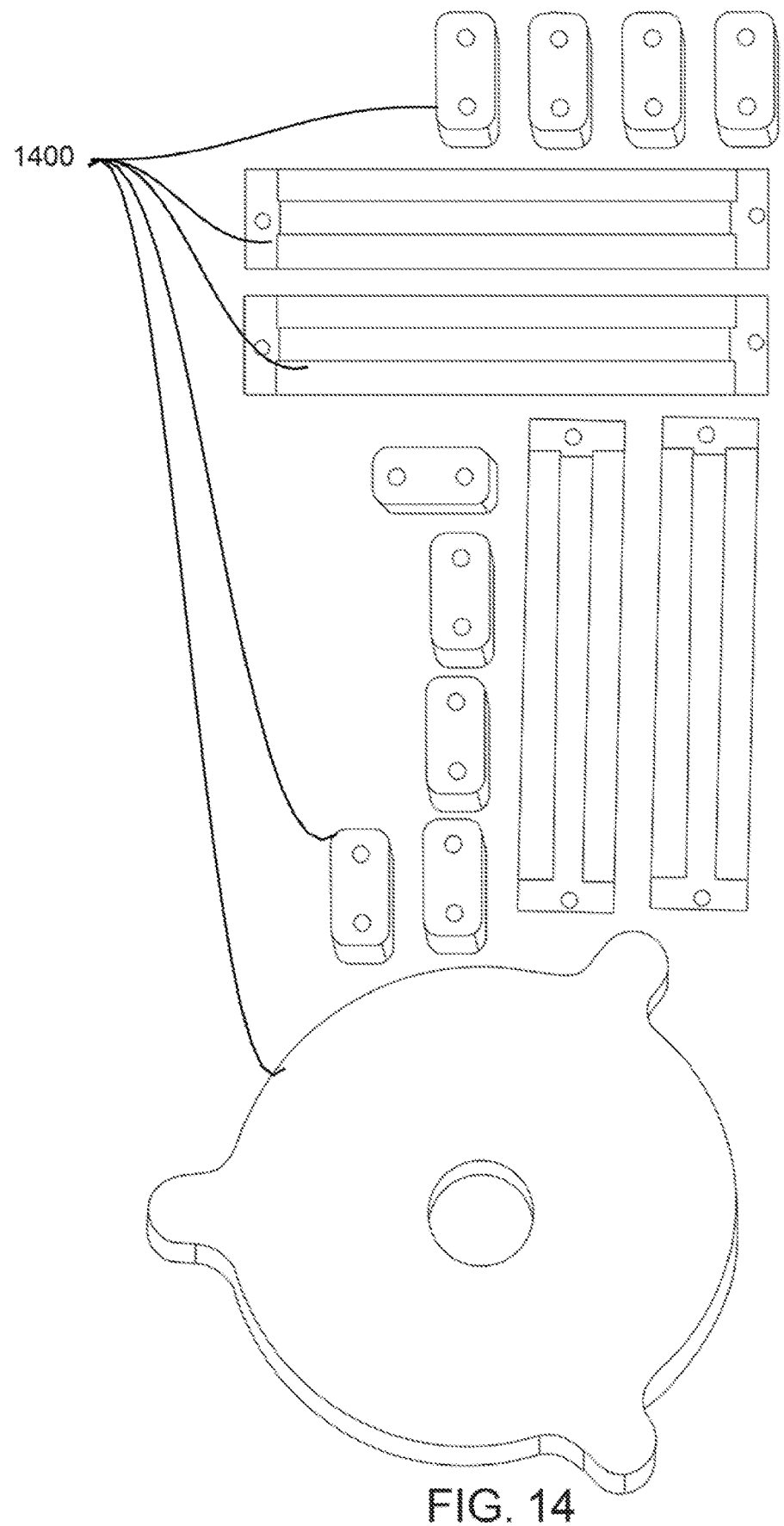
FIG. 14 is a perspective view illustrating an exemplary graphical representation of at least a precursor to a plurality of discrete objects in accordance with an embodiment.

Still referring to FIG. 13, and also referring to FIG. 14, at step 1305 a graphical representation of at least a precursor to a plurality of discrete objects 1400 is received. In an embodiment, graphical representation of at least a precursor to discrete object 1400 is received at a computing device, such as any computing device as described below in reference to FIG. 20. Graphical representation of at least a precursor to discrete object 1400 may be received at or opened in a CAD program, CAM program, or other program used for modeling objects for manufacture. Graphical representation of at least a precursor to discrete object 1400 may be received from another computing device via wired or wireless communication, or from a temporary memory storage device. Graphical representation of at least a precursor to a plurality of discrete objects 1400 may represent at least a precursor 204 to plurality of discrete objects as described above.

Still referring to FIGS. 13 and 14, in an embodiment, receiving graphical representation of at least a precursor to discrete object 1400 involves generating the graphical representation of the at least a precursor to discrete object 1400. A user may generate graphical representation of at least a precursor to discrete object 1400 in a modeling program such as a CAD program by assembling one or more geometric components of the graphical representation of the at least a precursor to discrete object 1400; one or more geometric components may include geometric primitives or more complex models.

Figure 15:
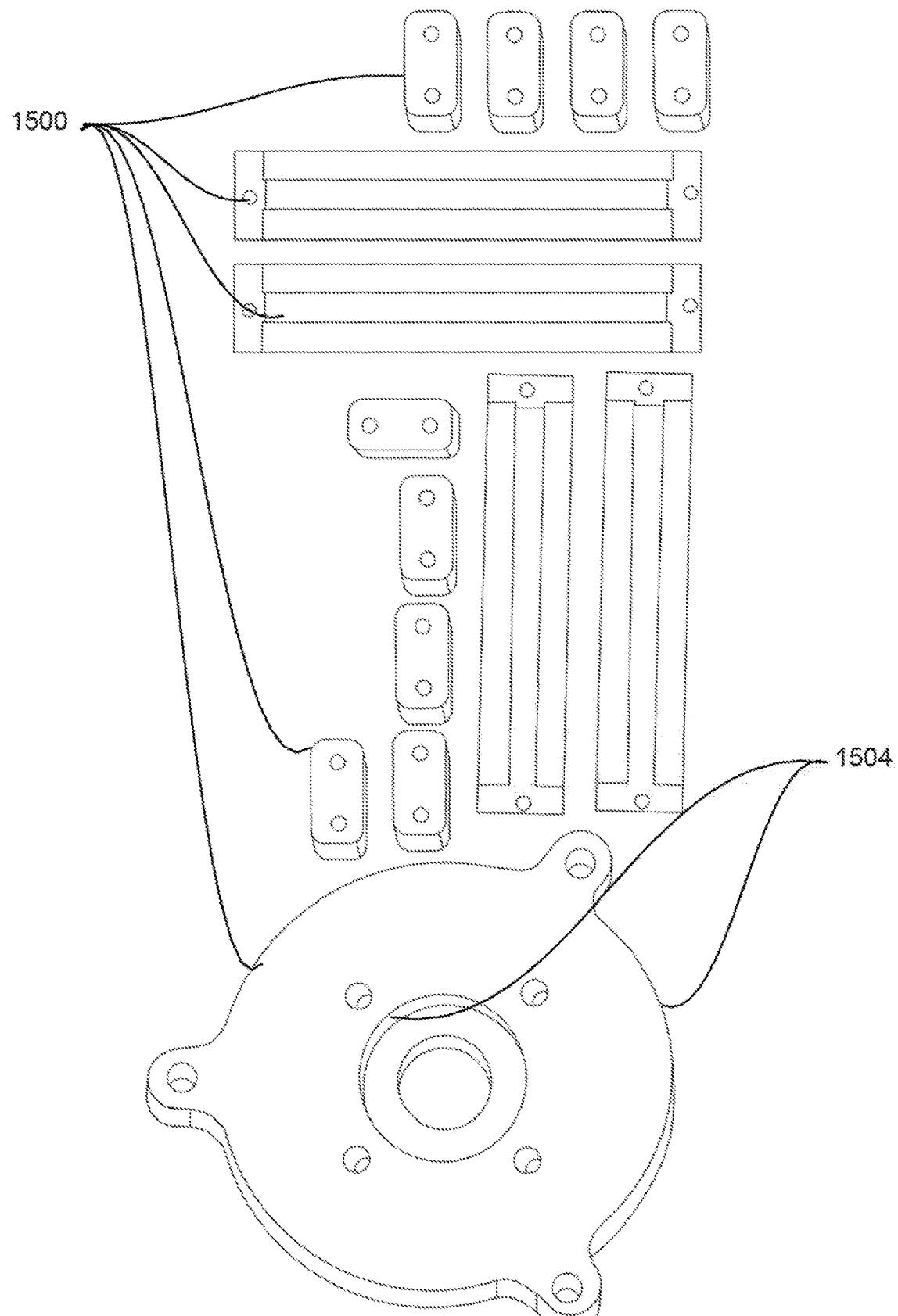
FIG. 15 is a perspective view illustrating an exemplary graphical representation of a plurality of discrete objects in accordance with an embodiment.

Continuing to refer to FIGS. 13 and 14, graphical representation of at least a precursor to discrete object 1400 may be generated as a function of another model. For example, at an optional step not shown, graphical representation of at least a precursor to discrete object 1400 may be generated as a function of one or more computer models of the plurality of discrete objects. Referring now to FIG. 15, an exemplary embodiment of a computer model of plurality of discrete objects 1500 is illustrated. Computer model of plurality of discrete objects 1500 may be received from another machine or generated by a user in a modeling program such as a CAD program; user may generate computer model by assembling geometric components as described above. Graphical representation of at least a precursor to discrete object 1400 may be generated by reproducing one or more geometric features 1504 of computer model of plurality of discrete objects 1500; one or more geometric features 1504 may be any feature representing at least a geometric characteristic 216 of the plurality of discrete objects as described above. In an embodiment, graphical representation of at least a precursor to discrete object 1400 is a graphical representation of a "near net" object as described above; for instance, the geometric representation of at least a precursor to discrete object 1400 may be substantially identical to computer model of plurality of discrete objects 1500 except for at least a feature 1508 to be formed, using subtractive manufacturing, from an additively manufactured body of material 200 as modeled in method 1300. At least a feature 1508 may be any feature of discrete object to be formed by subtractive manufacturing as described above.

Figure 16:
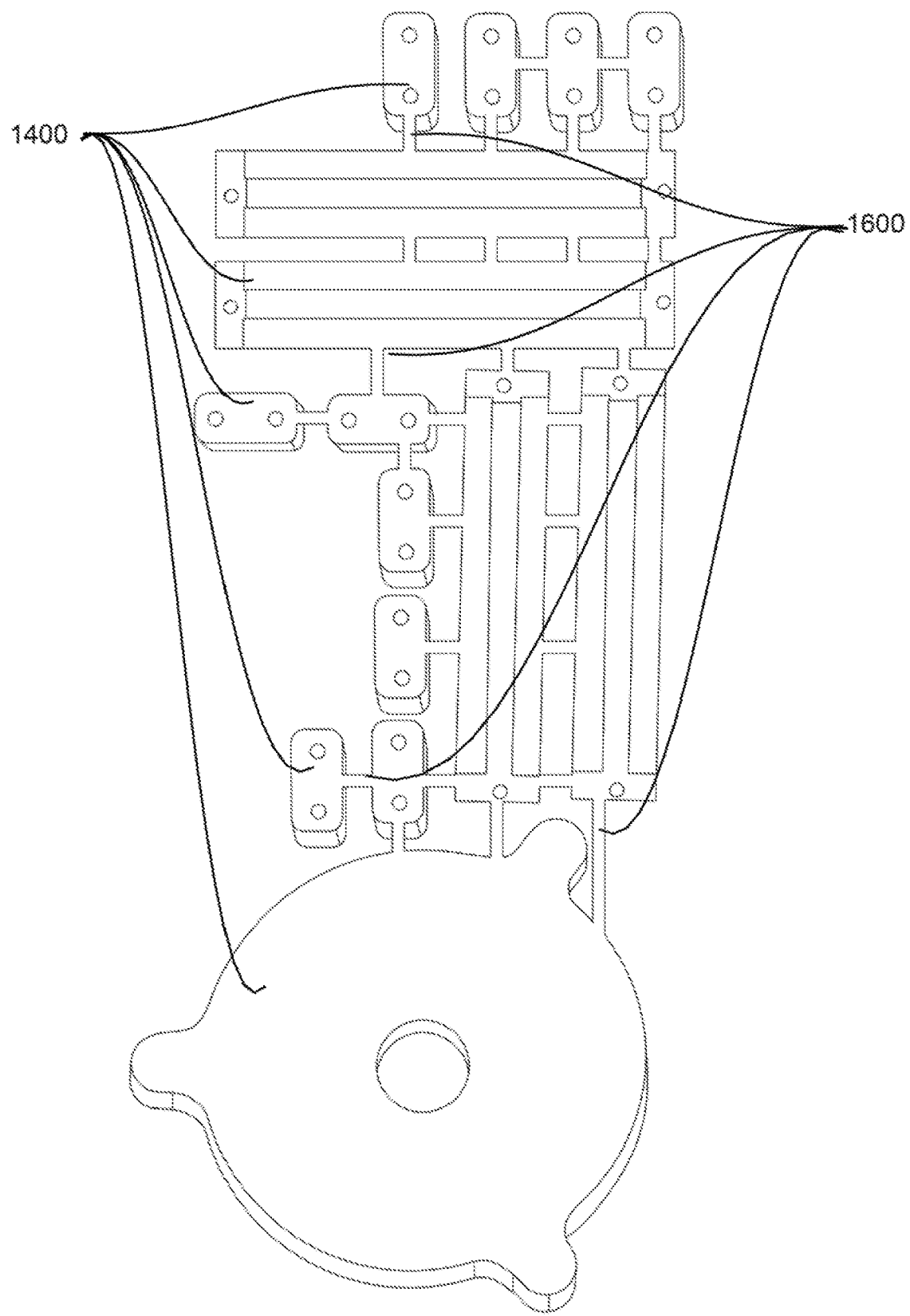
FIG. 16 is a perspective view illustrating an exemplary graphical representation of at least a precursor to a plurality of discrete objects with a graphical representation of at least an extension in accordance with an embodiment.

Still referring to FIG. 13, at step 1310, a graphical representation of the at least an extension is received. Graphical representation of at least an extension may represent at least an extension 208 as described above. Referring to FIGS. 13 and 16, graphical representation of at least an extension 1600 may be received from another machine or generated by a user in a modeling program such as a CAD program; user may generate computer model by assembling geometric components as described above. Graphical representation of at least an extension 1600 may be generated as a function of one or more other graphical representations or computer models. The graphical representation of the at least an extension may include a graphical representation of at least an interconnecting feature that joins at least two of the at least a precursor to the plurality of discrete objects. For instance, where graphical representation of at least an extension 1600 includes a graphical representation of at least an interconnecting feature as described above, graphical representation of at least an extension 1600 may be generated as a function of two or more precursors represented by graphical representation of at least a precursor; the graphical representation of the at least an interconnecting feature may be generated to represent any shape, size, form, or material composition described above for at least an interconnecting feature.

Still referring to FIGS. 13 and 16, where graphical representation of at least an extension 1600 includes a graphical representation of at least a support leg as described above, graphical representation of at least an extension 1600 may be generated as a function a precursor represented by graphical representation of at least a precursor, and of a locating feature as described above or a computer model (not shown) of a locating feature as described above. As a non-limiting example, locating feature may be a locating feature at a temporary support frame; graphical representation of at least a precursor to plurality of discrete objects may be placed in a three-dimensional space representing an opening of a temporary support frame, with graphical representation of at least a support leg generated to connect the at least a precursor to the plurality of discrete objects to temporary support frame or to a locating feature located at temporary support frame. Graphical representation of at least a support leg may be generated to represent any shape, size, form, or material composition described above for at least a support leg.

Figure 17:
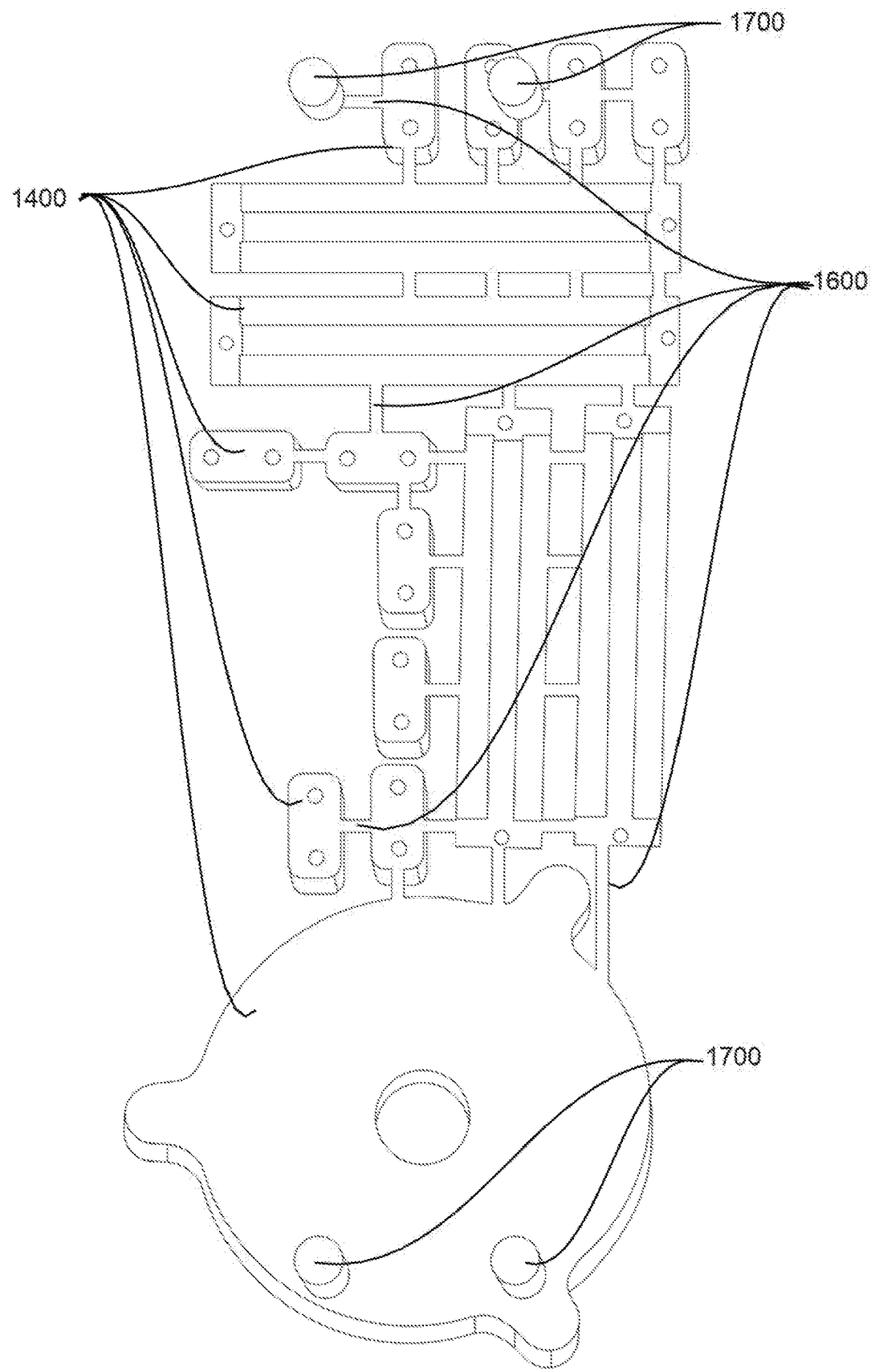
FIG. 17 is a perspective view illustrating an exemplary graphical representation of at least a precursor to a plurality of discrete objects with a graphical representation of at least an extension and a graphical representation of at least a reference feature in accordance with an embodiment.

Still referring to FIG. 13, and further referring to FIG. 17, at step 1315, a graphical representation 1700 of the at least a reference featured is received. Graphical representation of at least a reference feature graphical representation of at least a reference feature 1700 may be received with graphical representation of precursor to discrete object 1400; for instance, both graphical representation of precursor to discrete object 1400 and graphical representation of at least a reference feature 1700 may be received as part of a single CAD file or file used in another modeling program. Graphical representation of at least a reference feature graphical representation of at least a reference feature 1700 may be received with graphical representation of at least an extension 1600; for instance, both graphical representation of at least an extension 1600 and graphical representation of at least a reference feature 1700 may be received as part of a single CAD file or file used in another modeling program. Graphical representation of at least a reference feature 1700 may be generated. For instance, graphical representation of at least a reference feature 1700 may be generated as a function of at least a locating feature at a manufacturing device. In an embodiment, data describing at least a locating feature is received; data may include dimension, shape, or size data of at least a locating feature. Data may include a graphical representation of at least a locating feature. Data may be used to generate graphical representation of at least a reference feature 1700; for instance, graphical representation at least a reference feature 1700 may be generated to represent a reference feature that fits within a recess or around a projection. At least a locating feature may include one or more locating fixtures within manufacturing device 400 as described above. At least a locating feature may include one or more locating fixtures at a support, including without limitation a fixture or temporary support frame 800 as described above. Graphical representation of at least a reference feature 1700 may be generated to represent any at least a reference feature described above. For instance, graphical representation of at least a reference feature 1700 may include at least a projection. Graphical representation of at least a reference feature 1700 may include at least a recess.

Graphical representation of at least a reference feature 1700 may represent reference features located on any part of additively manufactured body of material 200 as described above. As a non-limiting example, graphical representation of at least a reference feature is located on the graphical representation of at least one of the at least a precursor to the plurality of discrete objects. Graphical representation of at least a reference feature is located on the graphical representation of the at least an extension; this may include location of at least a reference feature on at least an interconnecting feature or on at least a support leg, as described above.

Still referring to FIGS. 13 and 17, in an embodiment, graphical representation of at least a reference feature 1700 may be formed by superimposing a standard feature on the geometry of graphical representation of at least a precursor to discrete object 1400 or of graphical representation of at least an extension 1600; for instance, a standard shape may be an elongated form that is merged with graphical representation of at least a precursor to discrete object 1400 or of graphical representation of at least an extension 1600 to project above and below graphical representation of at least a precursor to discrete object 1400 or of graphical representation of at least an extension 1600, for instance to create representations of first-side reference features 708 and second-side reference features 712 as described above in reference to FIGS. 7A-B. In some embodiments, a plurality of graphical representations of reference features are formed as a function of a plurality of locating features, such as a plurality of bolt or stud holes on a base table, trunnion table, or rotary table, or locating frame features. In an embodiment, generation of graphical representation of at least a reference feature using a graphical representation of at least a locating feature, for instance by superimposing a model of one graphical representation on another and generating a modified model as a result; techniques for performing this process may follow any means or method disclosed in U.S. Non-provisional patent application Ser. No. 15/939,209, filed on Mar. 28, 2018, the entirety of which is incorporated herein by reference.

In an embodiment, and still viewing FIG. 17, graphical representation of at least a reference feature may further include a graphical representation of a first feature on a first surface of precursor to the discrete object and a graphical representation of a second feature on a second surface of precursor to the discrete object; this may be implemented as described above in reference to FIGS. 1-16. As a non-limiting example, interrogation as described above may demonstrate that, in a first orientation selected as described above for subtractive manufacture of discrete object, a first set of reference features may be required to maintain additively manufactured body of material in that first orientation, for instance by joining the first set of reference features to at least a locating feature, while in a second orientation a second set of reference features may be required to maintain additively manufactured body of material in that orientation; automated manufacturing device 400 and/or controller 224 may generate each of first set of reference features and second set of reference features, for instance, by transforming graphical model of at least a precursor into the first orientation and then second orientation, and performing methods as described further herein for generation of graphical representations of first set of reference features and second set of reference features in each orientation.

With continued reference to FIG. 17, in an embodiment, graphical representation of the at least a reference feature further includes a graphical representation of a first reference feature that extends a first distance from a first surface of the precursor to the discrete object and a graphical representation of a second reference feature that extends a second distance from a second surface of the precursor to the discrete object; as noted above, the first distance may be greater than the second distance. This may be performed, for instance, via interrogation as disclosed above; in a selected orientation, a portion of a surface facing at least a locating feature may be at a greater distance from the at least a locating feature than another portion, as determined by, for instance, geometric analysis of a model combining a model of at least a locating feature with a model of at least a precursor, based upon which first reference feature and second reference feature may be generated with differing lengths to maintain at least a precursor in the selected orientation when at least a reference feature is joined to at least a locating feature.

Still referring to FIGS. 13 and 17, at step 1320 a graphical representation of a first plane 1704 and a graphical representation of a second plane 1708 is received, where machining the plurality of discrete objects from the additively manufactured body of material 200 includes removal of material from at least one of the first plane and the second plane. As a non-limiting example, first plane 1704 may include a surface of additively manufactured body of material 200 from which material is removed when additively manufactured body of material 200 is in a first orientation; second plane 1708 may include a surface of additively manufactured body of material 200 from which material is removed when additively manufactured body of material 200 is in a first orientation. In an embodiment, generating the computer model of the additively manufactured body of material 200 may include generating the computer models of the first plane and the second plane as a function of the at least a computer model of the at least a precursor to the plurality of discrete objects to be machined from the additively manufactured body of material 200.

At step 1325, the computer model of the additively manufactured body of material 200 is generated; the computer model of the additively manufactured body of material 200 includes the graphical representation of the first plane, the graphical representation of the second plane, the graphical representation of the at least a precursor to the plurality of discrete objects to be machined from the additively manufactured body of material 200, the graphical representation of at least an extension, and the graphical representation of the at least a reference feature.

In an additional optional step not shown, additive manufacture control instructions may be generated as a function of computer model of body of material. Additive manufacture control instructions may be transmitted to an additive manufacturing device to manufacture precursor to discrete object, at least a reference feature, or additively manufactured body of material 200, for instance as described above.

Subtractive machine control instructions may be generated in another optional step not illustrated as a function of computer model of body of material. Subtractive machine control instructions may be transmitted to a manufacturing device 400, for instance instructing manufacturing device to manufacture a discrete object as described above. This may be implemented as described below in reference to FIGS. 18 and/or 19. In an embodiment, generating model of an additively manufactured body of material 200 in accordance with the disclosed method improves the function of computer modeling programs such as CAD programs by enhancing the ability of computer modeling programs to design manufacturing processes; improvements may include the ability to plan manufacturing processes that combine the geometric flexibility of additive manufacturing with the precision and speed of subtractive manufacturing processes. In an embodiment, generating model of an additively manufactured body of material 200 in accordance with the disclosed method improves manufacturing processes and technology by enabling optimal combination of additive and subtractive manufacturing techniques; improvements may include the ability to use manufacturing processes that combine the geometric flexibility of additive manufacturing with the precision and speed of subtractive manufacturing processes.

In an embodiment, and still viewing FIG. 17, automated manufacturing device 400 and/or controller 424 may initiate manufacture of the additively manufactured body of material as a function of the graphical representation of the additively manufactured body of material. This may be performed as described above in reference to FIGS. 1-16, and/or as described in any material incorporated herein by reference. Initiation of manufacture may include performance of a first step in the removal of material from additively manufactured body of material and/or addition of material to additively manufactured body of material as described above; first step may include a particular milling or cutting operation, such as the performance of a registration cut. First step may include location of body of material at an automated manufacturing device; location may include placement in a precise position and/or registration within a coordinate system used by automated manufacturing device to guide particular manufacturing steps. First step may include generation of a control instruction initiating manufacturing steps; generation of a control instruction may include transmission of a signal to initiate manufacture and/or transmission of any machine control instruction sets generated as described above, including without limitation transmission of information for localized and machine-specific machine-control instruction generation. Transmission may be direct or indirect; for instance, transission may involve transmission to a remote device that relays transmission to an automated manufacturing device or computing device coupled thereto, or transmission to an auxiliary computing device or computer memory for transport to the automated manufacturing device and/or computing device coupled thereto. Initiation of manufacture may include initiating additive manufacture of the additively manufactured body of material as a function of the graphical representation of the additively manufactured body of material. Initiating manufacture may include initiating subtractive manufacture of at least a discrete object from the additively manufactured body of material; this may be performed as a function of graphical representation of additively manufacture body of material, a graphical representation of one or more discrete objects, or both.

With continued reference to FIG. 17, automated manufacturing device 400 and/or controller 424 may generate at least a machine-control instruction to subtractively manufacture at least a discrete object from the additively manufactured body of material. This may be performed as described above in reference to FIGS. 1-16, and/or as described in any material incorporated herein by reference. Generating the at least a machine-control instruction may include receiving a graphical representation of the at least a discrete object and generating the at least a machine-control instruction as a function of the graphical representation of the at least a discrete object, for example and without limitation as described above in reference to FIGS. 1-16 and/or in any material incorporated herein by reference. Controller 424 may initiate manufacture of the additive body of material and/or discrete object. This may be performed as described above in reference to FIGS. 1-16, and/or as described in any material incorporated herein by reference. Initiation of manufacture may include performance of a first step in the removal of material from additively manufactured body of material and/or addition of material to additively manufactured body of material as described above; first step may include a particular milling or cutting operation, such as the performance of a registration cut. First step may include location of body of material at an automated manufacturing device; location may include placement in a precise position and/or registration within a coordinate system used by automated manufacturing device to guide particular manufacturing steps. First step may include generation of a control instruction initiating manufacturing steps; generation of a control instruction may include transmission of a signal to initiate manufacture and/or transmission of any machine control instruction sets generated as described above, including without limitation transmission of information for localized and machine-specific machine-control instruction generation. Transmission may be direct or indirect; for instance, transmission may involve transmission to a remote device that relays transmission to an automated manufacturing device or computing device coupled thereto, or transmission to an auxiliary computing device or computer memory for transport to the automated manufacturing device and/or computing device coupled thereto. Initiation of manufacture may include initiating additive manufacture of the additively manufactured body of material as a function of the graphical representation of the additively manufactured body of material. Initiating manufacture may include initiating subtractive manufacture of at least a discrete object from the additively manufactured body of material; this may be performed as a function of graphical representation of additively manufacture body of material, a graphical representation of one or more discrete objects, or both.

In an embodiment, methods and systems described above improve the efficiency of manufacturing processes by permitting an additively manufactured body to be set up at a manufacturing device using features, created during additive manufacturing, that match up to features of the manufacturing device. As the additive process may be modeled to create such reference features automatically, this may eliminate the need for skilled or time-consuming setup procedures; a person with relatively little training may set up a workpiece so produced by mating an additively created reference feature to a corresponding feature at the manufacturing device. As a result, one or more setups may be performed rapidly and at little cost. Subtractive manufacturing may be used to remove reference features that are no longer required.

Referring now to FIG. 18, an exemplary embodiment of a method 1800 of generating a machine-control instruction set adapted to control machining equipment to machine a plurality of discrete objects from an additively manufactured body of material 200 including at least a precursor to a plurality of discrete objects, at least an extension, at least a reference feature, and a first plane and a second plane is illustrated. At step 1805, a computer model of an additively manufactured body of material 200 is generated. At step 1810, computer model of additively manufactured body of material 200 is generated by steps that include receiving a computer model of an additively manufactured body of material 200, wherein the computer model of the additively manufactured body of material 200 includes computer models of the first plane and the second plane, at least a computer model of the at least a precursor to the plurality of discrete objects to be machined from the additively manufactured body of material 200, a computer model of the at least an extension, and a computer model of the at least a reference feature. At step 1815, computer model of additively manufactured body of material 200 is generated by steps that include receiving spatial bounds of the body of material. At step 1820, a machine-control instruction set based on the foregoing steps is generated. Machine-control instruction set is generated so as to remove, from the first plane of the additively manufactured body of material 200, a portion of at least a precursor to the plurality of discrete objects, and to remove, from the second plane of the additively manufactured body of material 200, at least a second portion of at least a precursor to the plurality of discrete objects.

Still referring now to FIG. 18, computer model of additively manufactured body of material 200 is generated by steps that include receiving a computer model of an additively manufactured body of material 200, wherein the computer model of the additively manufactured body of material 200 includes computer models of the first plane and the second plane, at least a computer model of the at least a precursor to the plurality of discrete objects to be machined from the additively manufactured body of material 200, a computer model of the at least an extension, and a computer model of the at least a reference feature. As a non-limiting example, this may be accomplished as described above in reference to FIG. 13. In an embodiment, generating the computer model of the additively manufactured body of material 200 involves generating the computer models of the first plane and the second plane as a function of the at least a computer model of the at least a precursor to the plurality of discrete objects to be machined from the additively manufactured body of material 200.

At step 1815, computer model of additively manufactured body of material 200 is generated by steps that include receiving spatial bounds of the additively manufactured body of material 200. Spatial bounds of the body of material may be defined according to a coordinate system; for instance, where computer model of additively manufactured body of material 200 is generated with a CAD program, CAM program, or similar modeling or manufacture design program, a coordinate system used to scale, orient, or design the computer model of additively manufactured body of material 200 may also be used to define spatial bounds of additively manufactured body of material 200. Where manufacturing device 400 at which machine-control instruction set is to be implemented receives instructions by reference to a coordinate system, such as may be the case where the manufacturing device 400 is a CNC machine, spatial bounds may be defined according to that coordinate system. Spatial bounds may define a distance from an origin of coordinate system beyond which additively manufactured body of material 200 does not extend. Spatial bounds may define a curved, polyhedral, or other solid describing a space in which additively manufactured body is wholly contained, such as a rectangular prism, sphere, or other form.

At step 1820, a machine-control instruction set based on the foregoing steps is generated. Generated machine-control instruction set contains the instructions for controlling a manufacturing device 400, such as one or more pieces of numerical control (NC) machining equipment, such as one or more NC milling machines, to perform the machining on the additively manufactured body of material 200 to create plurality of discrete objects. Generating the machine-control instruction set accounts for, among other things, 1) computer models of i) plurality of discrete objects, ii) at least an extension, and iii) at least a reference feature, 2) the secondary manufacturing device 400 or devices to be used, including any particular tool(s), 3) the actual dimensions of the additively manufactured body of material 200, including without limitation spatial bounds of the additively manufactured body of material 200 as described above, 4) any datum(s) provided to properly locate the additively manufactured body of material 200 relative to the machining equipment, including without limitation data describing the at least a reference feature, and 5) separate machining steps for removing material from an first side of the additively manufactured body of material 200 and for removing material from a second side of the additively manufactured body of material 200.

As a simple example in which one single-ended CNC end mill is used for all of the milling on the first and second sides of additively manufactured body of material 200, the machine-control instruction set includes instructions for directing the cutting tool of the end mill along a first path on the first side of the additively manufactured body of material 200 that forms features on a corresponding side of plurality of discrete objects to be formed from the additively manufactured body of material 200, and 2) instructions for directing the cutting tool of the end mill along a second path on the second side of the additively manufactured body of material 200 for to form features on a corresponding side of plurality of discrete objects to be formed from the additively manufactured body of material 200.

As those skilled in the art will readily appreciate, the machine-control instruction set may be generated as a function of 1) the specific machining tool(s) (e.g., milling bit(s)) that will be used during the machining of the additively manufactured body of material 200 to create plurality of discrete objects as well as 2) the size of the additively manufactured body of material 200. It is noted that the specific machining tool(s) have been at least partially accounted for in the process of defining the offsets for the objects and any occupying structures. The size of additively manufactured body of material 200, for instance as defined by spatial limits of the additively manufactured body of material 200, is used to define where the machining equipment will actually be removing material and engaging the additively manufactured body of material 200. Other inputs, such as type of material (e.g., to control machining speed), may also be used for generating the machine-control instruction set as needed or desired. The generation of the machine-control instruction set may be performed automatically, such as by intelligent CAM software (e.g., CAMWORKS® software available from Geometric Technologies, Inc., Scottsdale, Ariz.), performed semi-automatically with the assistance of a user (such as when the CAM software does not have intelligence on how to handle certain physical features), or under the complete control of a user.

Machine-control instruction set is generated so as to remove, from the first plane of the additively manufactured body of material 200, a portion of at least a precursor to the plurality of discrete objects, and to remove, from the second plane of the additively manufactured body of material 200, at least a second portion of at least a precursor to the plurality of discrete objects. Machine-control instruction set may be generated to operate within spatial bounds of additively manufactured body of material 200; in some embodiments, machine-control instruction sets involve a series of motions from or by reference to an origin point within a coordinate system as described above. In some embodiments, machine-control instruction set is based upon one or more features to be formed in additively manufactured body of material 200 to produce plurality of discrete objects. For instance, generating machine-control instruction set may include receiving a computer model of at least a discrete object of the plurality of discrete objects to be machined from the additively manufactured body of material 200, generating, as a function of the computer model of the at least a discrete object, the machine-control instruction set. Machine-control instruction set may further be generated as a function of computer model of additively manufactured body of material 200; for instance, a tool path may use an exterior shape of additively manufactured body of material 200, as represented by the computer model of the additively manufactured body of material 200, to guide motion of manufacturing tool 404.

Figure 19:
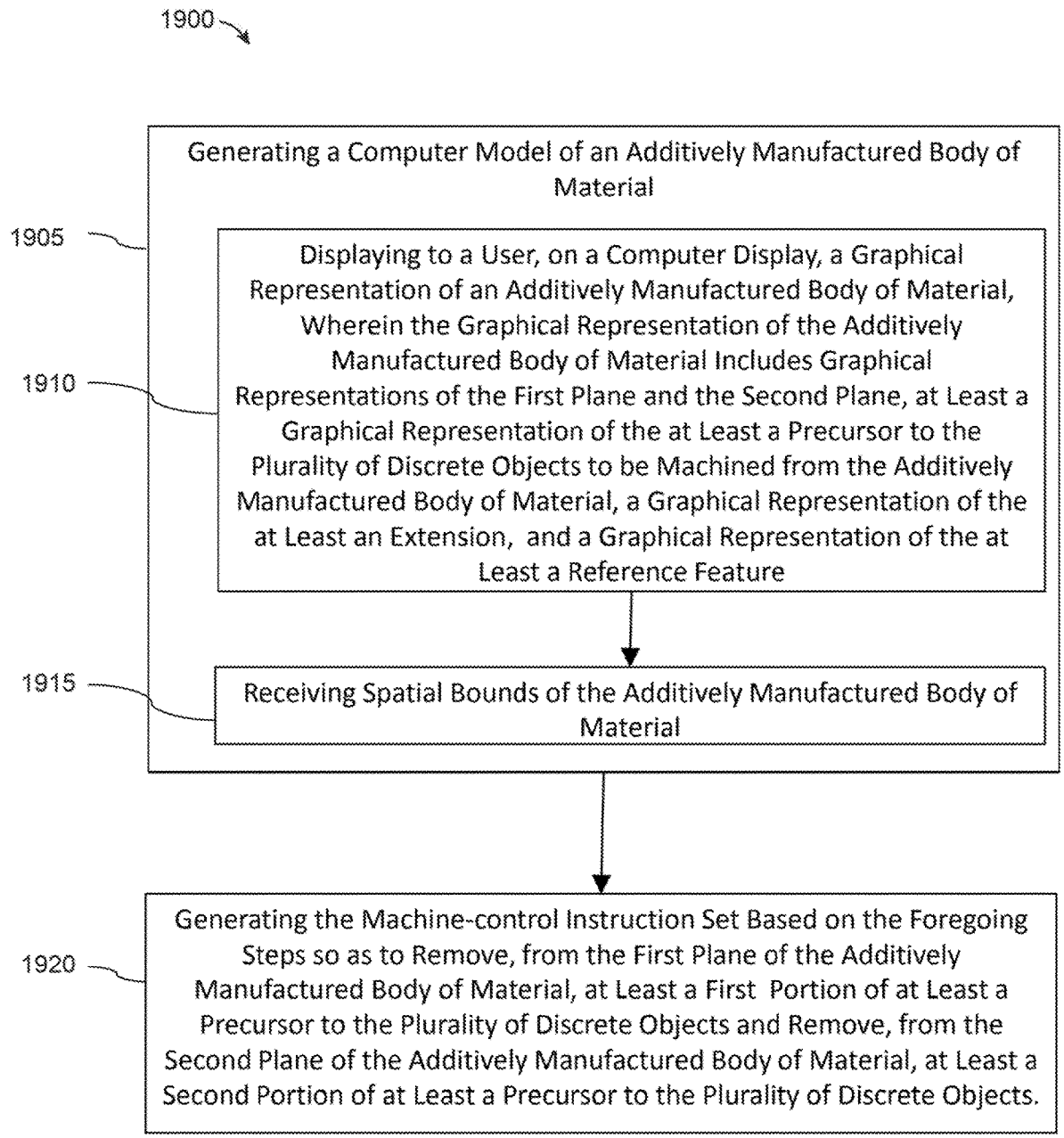
FIG. 19 is a flow diagram illustrating an exemplary method of generating a machine-control instruction set adapted to control machining equipment to machine a plurality of discrete objects from an additively manufactured body of material in accordance with an embodiment.

Referring now to FIG. 19, an exemplary embodiment of a method 1900 of generating a machine-control instruction set adapted to control machining equipment to machine a plurality of discrete objects from an additively manufactured body of material 200 including at least a precursor to a plurality of discrete objects, at least an extension, at least a reference feature, and a first plane and a second plane is illustrated. At step 1905, a computer model of an additively manufactured body of material 200 is generated. This may be implemented for example as described above in reference to FIG. 18. At step 1910, computer model of additively manufactured body of material 200 is generated by steps that include displaying to a user, on a computer display, a graphical representation of an additively manufactured body of material 200, wherein the graphical representation of the additively manufactured body of material 200 includes graphical representations of the first plane and the second plane, at least a graphical representation of the at least a precursor to the plurality of discrete objects to be machined from the additively manufactured body of material 200, a graphical representation of the at least an extension, and a graphical representation of the at least a reference feature. This may be implemented, as a non-limiting example, as described above in reference to step 1810 of FIG. 18. Display to user may be accomplished using a graphical user interface, such as any graphical user interface used or usable with a CAD or CAM program; the display may be physically accomplished using any display as described below in reference to FIG. 20.

At step 1915, computer model of additively manufactured body of material 200 is generated by steps that include receiving spatial bounds of the body of material. This may be accomplished for instance as described above for step 1815. At step 1920, a machine-control instruction set based on the foregoing steps is generated. Machine-control instruction set is generated so as to remove, from the first plane of the additively manufactured body of material 200, a portion of at least a precursor to the plurality of discrete objects, and to remove, from the second plane of the additively manufactured body of material 200, at least a second portion of at least a precursor to the plurality of discrete objects. Step 1920 may be implemented, as a non-limiting example, according to any method described for implementation of step 1820 above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 20:
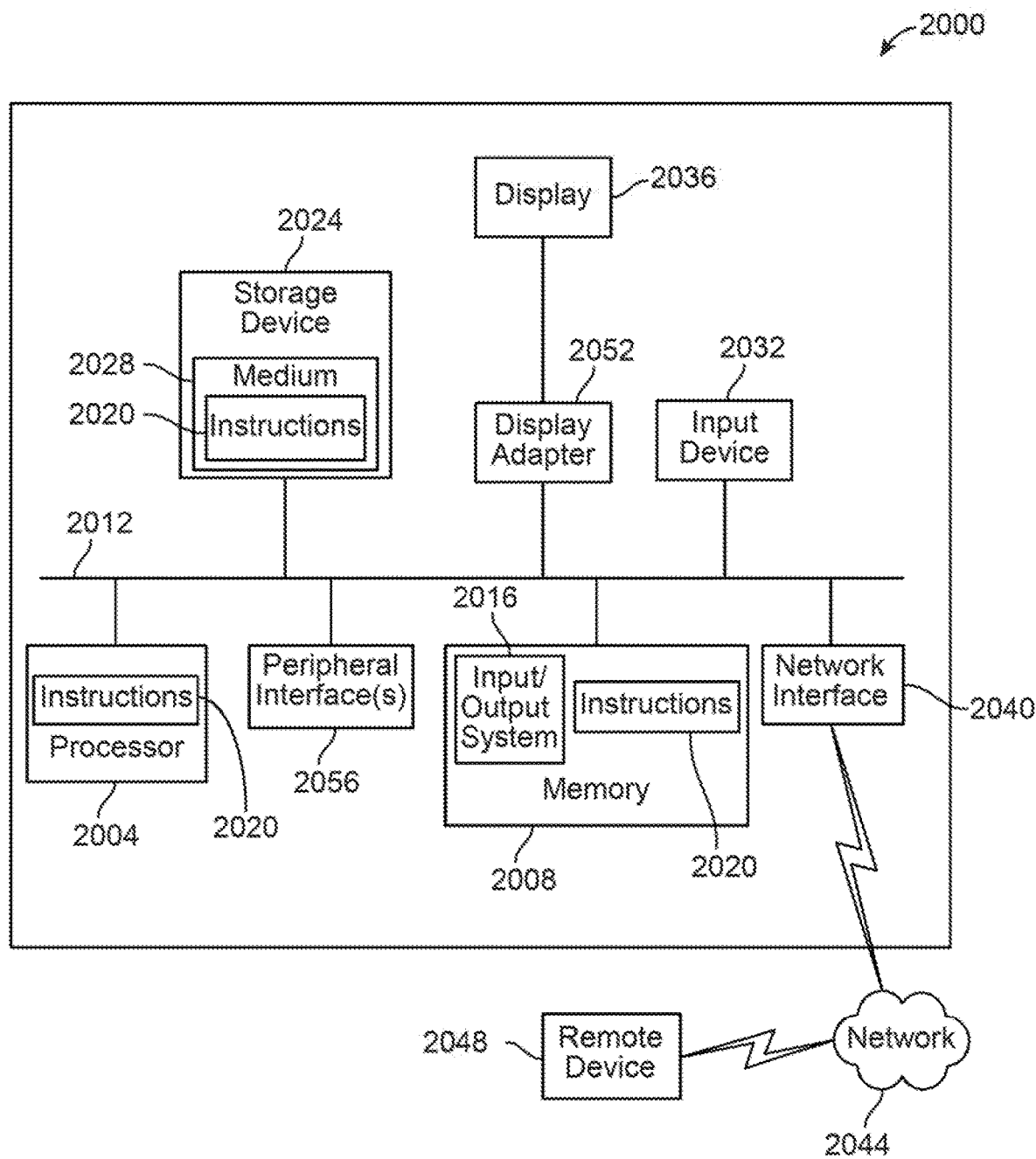
FIG. 20 is a diagrammatic representation of one embodiment of a computing device in the exemplary form.

FIG. 20 shows a diagrammatic representation of one embodiment of a computing device in the exemplary form of a computer system 2000 within which a set of instructions, such as certain steps of FIG. 1, for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 2000 includes a processor 2004 and a memory 2008 that communicate with each other, and with other components, via a bus 2012. Bus 2012 may include any of several types of bus structures including, but not limited to, a memory bus, a memory controller, a peripheral bus, a local bus, and any combinations thereof, using any of a variety of bus architectures.

Memory 2008 may include various components (e.g., machine-readable media) including, but not limited to, a random access memory component, a read only component, and any combinations thereof. In one example, a basic input/output system 2016 (BIOS), including basic routines that help to transfer information between elements within computer system 2000, such as during start-up, may be stored in memory 2008. Memory 2008 may also include (e.g., stored on one or more machine-readable media) instructions (e.g., software) 2020 embodying any one or more of the aspects and/or methodologies of the present disclosure. In another example, memory 2008 may further include any number of program modules including, but not limited to, an operating system, one or more application programs, other program modules, program data, and any combinations thereof.

Computer system 2000 may also include a storage device 2024. Examples of a storage device (e.g., storage device 2024) include, but are not limited to, a hard disk drive, a magnetic disk drive, an optical disc drive in combination with an optical medium, a solid-state memory device, and any combinations thereof. Storage device 2024 may be connected to bus 2012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 2024 (or one or more components thereof) may be removably interfaced with computer system 2000 (e.g., via an external port connector (not shown)). Particularly, storage device 2024 and an associated machine-readable medium 2028 may provide nonvolatile and/or volatile storage of machine-readable instructions, data structures, program modules, and/or other data for computer system 2000. In one example, software 2020 may reside, completely or partially, within machine-readable medium 2028. In another example, software 2020 may reside, completely or partially, within processor 2004.

Computer system 2000 may also include an input device 2032. In one example, a user of computer system 2000 may enter commands and/or other information into computer system 2000 via input device 2032. Examples of an input device 2032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 2032 may be interfaced to bus 2012 via any of a variety of interfaces (not shown) including, but not limited to, a serial interface, a parallel interface, a game port, a USB interface, a FIREWIRE interface, a direct interface to bus 2012, and any combinations thereof. Input device 2032 may include a touch screen interface that may be a part of or separate from display 2036, discussed further below. Input device 2032 may be utilized as a user selection device for selecting one or more graphical representations in a graphical interface as described above.

A user may also input commands and/or other information to computer system 2000 via storage device 2024 (e.g., a removable disk drive, a flash drive, etc.) and/or network interface device 2040. A network interface device, such as network interface device 2040, may be utilized for connecting computer system 2000 to one or more of a variety of networks, such as network 2044, and one or more remote devices 2048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 2044, may employ a wired and/or a wireless mode of communication. In general, any network topology may be used. Information (e.g., data, software 2020, etc.) may be communicated to and/or from computer system 2000 via network interface device 2040.

Computer system 2000 may further include a video display adapter 2052 for communicating a displayable image to a display device, such as display device 2036. Examples of a display device include, but are not limited to, a liquid crystal display (LCD), a cathode ray tube (CRT), a plasma display, a light emitting diode (LED) display, and any combinations thereof. Display adapter 2052 and display device 2036 may be utilized in combination with processor 2004 to provide graphical representations of aspects of the present disclosure. In addition to a display device, computer system 2000 may include one or more other peripheral output devices including, but not limited to, an audio speaker, a printer, and any combinations thereof. Such peripheral output devices may be connected to bus 2012 via a peripheral interface 2056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Furthermore, the foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for manufacturing a plurality of discrete objects from an additively manufactured body of material from a computer model of the additively manufactured body of material, the additively manufactured body of material including at least a precursor to the plurality of discrete objects, at least an extension, and at least a reference feature, the system comprising:
an automated manufacturing device, the automated manufacturing device comprising at least a controller configured to receive a graphical representation of the at least a precursor to the plurality of discrete objects to be machined from the additively manufactured body of material, receive a graphical representation of the at least an extension, receive a graphical representation of the at least a reference feature, receive a graphical representation of a first plane and a graphical representation of a second plane, and generate the computer model of the additively manufactured body of material, wherein the computer model of the additively manufactured body of material includes the graphical representation of the first plane, the graphical representation of the second plane, the graphical representation of the at least a precursor to the plurality of discrete objects to be machined from the additively manufactured body of material, the graphical representation of at least an extension, and the graphical representation of the at least a reference feature
wherein the graphical representation of at least a reference feature is located on the graphical representation of the at least an extension.

2. The system of claim 1, wherein the automated manufacturing device further comprises at least a manufacturing tool.

3. The system of claim 2, wherein the at least a manufacturing tool further comprises an additive manufacturing tool.

4. The system of claim 3, wherein the controller is further configured to manufacture the additively manufactured body of material using the additive manufacturing tool.

5. The system of claim 2, wherein the at least a manufacturing tool further comprises a subtractive manufacturing tool.

6. The system of claim 5, wherein the controller is further configured to subtractively manufacture a plurality of discrete objects from the additively manufacture body of material.

7. The system of claim 1, wherein the controller is further configured to generate at least a machine-control instruction to additively manufacture at least a discrete object from the additively manufactured body of material.

8. The system of claim 1, wherein the controller is further configured to generate at least a machine-control instruction to subtractively manufacture at least a discrete object from the additively manufactured body of material.

9. The system of claim 1, wherein the controller is further configured to receive a graphical representation of the at least a discrete object; and generate the at least a machine-control instruction as a function of the graphical representation of the at least a discrete object.

10. A method of manufacturing a discrete object from an additively manufactured body of material, the additively manufactured body of material including at least a precursor to a plurality of discrete objects, at least an extension, and at least a reference feature, the method comprising:
receiving a graphical representation of the at least a precursor to the plurality of discrete objects to be machined from the additively manufactured body of material;
receiving a graphical representation of the at least an extension;
receiving a graphical representation of the at least a reference feature;
receiving a graphical representation of a first plane and a graphical representation of a second plane; and
generating the computer model of the additively manufactured body of material, wherein the computer model of the additively manufactured body of material includes the graphical representation of the first plane, the graphical representation of the second plane, the graphical representation of the at least a precursor to the plurality of discrete objects to be machined from the additively manufactured body of material, the graphical representation of the at least an extension, and the graphical representation of the at least a reference feature;
wherein the graphical representation of at least a reference feature is located on the graphical representation of the at least an extension.

11. The method of claim 10, wherein the graphical representation of the at least an extension includes a graphical representation of at least an interconnecting feature that joins at least two of the at least a precursor to the plurality of discrete objects.

12. The method of claim 11, wherein receiving the graphical representation of the at least an extension further comprises generating the graphical representation of at least an interconnecting feature as a function of the graphical representation of the at least two of the at least a precursor to the plurality of discrete objects.

13. The method of claim 10, wherein the graphical representation of the at least an extension includes a graphical representation of at least a support leg extending from at least one of the at least a precursor to the plurality of discrete objects.

14. The method of claim 10, wherein the graphical representation of at least a reference feature is further located on the graphical representation of at least one of the at least a precursor to the plurality of discrete objects.

15. The method of claim 10, wherein receiving the graphical representation of the at least a reference feature further comprises generating the graphical representation of the at least a reference feature as a function of at least a locating feature within a manufacturing device.

16. The method of claim 10, wherein receiving the graphical representation of the at least a reference feature further comprises generating the graphical representation of the at least a reference feature as a function of at least a locating feature within a support.

17. The method of claim 10, wherein receiving the graphical representation of the at least a precursor to the plurality of discrete objects further comprises:
   receiving one or more computer models of the plurality of discrete objects; and
   generating the graphical representation of the at least a precursor to the plurality of discrete objects as a function of the one or more computer models of the plurality of discrete objects.

18. The method of claim 10, wherein the graphical representation of the at least a reference feature includes at least a projection.

19. The method of claim 10, wherein the graphical representation of the at least a reference feature includes at least a recess.

20. The method of claim 10, wherein the graphical representation of the at least a reference feature further comprises:
   a graphical representation of a first feature on a first surface of the at least a precursor to the discrete object; and
   a graphical representation of a second feature on a second surface of the at least a precursor to the discrete object.

21. The method of claim 10, wherein the graphical representation of the at least a reference feature further comprises:
   a graphical representation of a first reference feature that extends a first distance from a first surface of at least one of the of at least one of the precursor and at least an extension precursor and at least an extension to the discrete object; and
   a graphical representation of a second reference feature that extends a second distance from a second surface of at least one of the precursor and at least an extension to the discrete object, wherein the first distance is greater than the second distance.

22. The method of claim 10 further comprising initiating manufacture of the additively manufactured body of material as a function of the graphical representation of the additively manufactured body of material.

23. The method of claim 22, wherein generating the at least a machine-control instruction further comprises:
   receiving a graphical representation of the at least a discrete object; and
   generating the at least a machine-control instruction as a function of the graphical representation of the at least a discrete object.

24. The method of claim 10, further comprising generating at least a machine-control instruction to subtractively manufacture at least a discrete object from the additively manufactured body of material.

25. The method of claim 10 further comprising initiating subtractive manufacture of at least a discrete object from the additively manufactured body of material.

* * * * *